(12) United States Patent
Taha et al.

(10) Patent No.: US 12,494,736 B2
(45) Date of Patent: *Dec. 9, 2025

(54) MECHANICAL STOP ASSEMBLY

(71) Applicant: NEVADOS ENGINEERING, INC., San Francisco, CA (US)

(72) Inventors: Yezin Taha, San Francisco, CA (US); Amitoj Gill, Roseville, CA (US); Laura Sverchek, San Francisco, CA (US)

(73) Assignee: NEVADOS ENGINEERING, INC., Oakland, CA (US)

( * ) Notice: Subject to any disclaimer, the term of this patent is extended or adjusted under 35 U.S.C. 154(b) by 954 days.

This patent is subject to a terminal disclaimer.

(21) Appl. No.: 17/549,639

(22) Filed: Dec. 13, 2021

(65) Prior Publication Data

US 2022/0187409 A1 Jun. 16, 2022

Related U.S. Application Data

(60) Provisional application No. 63/125,333, filed on Dec. 14, 2020.

(51) Int. Cl.
*H02S 20/32* (2014.01)
*F16B 7/04* (2006.01)
(Continued)

(52) U.S. Cl.
CPC ............ *H02S 20/32* (2014.12); *F16B 7/0406* (2013.01); *F16C 11/04* (2013.01); *F16C 17/02* (2013.01); *F16C 17/04* (2013.01); *F16C 17/107* (2013.01); *F16C 33/20* (2013.01); *F16M 11/10* (2013.01); *F24S 25/13* (2018.05); *F24S 25/30* (2018.05); *F24S 25/60* (2018.05); *F24S 25/634* (2018.05); *F24S 25/70* (2018.05); *F24S 30/40* (2018.05);
(Continued)

(58) Field of Classification Search
CPC ......... F24S 30/425; Y02E 10/47; H02S 20/32
See application file for complete search history.

(56) References Cited

U.S. PATENT DOCUMENTS

| 7,531,741 B1 | 5/2009 | Melton et al. |
| 8,166,709 B2 | 5/2012 | Moreno |

(Continued)

FOREIGN PATENT DOCUMENTS

| CN | 203788228 U | 8/2014 |
| CN | 106533343 A | 3/2017 |

(Continued)

OTHER PUBLICATIONS

From the EPO as the ISA, "International Search Report", PCT/US2021/063267, Jul. 15, 2022, 10 pages.

(Continued)

*Primary Examiner* — Bradley Duckworth
(74) *Attorney, Agent, or Firm* — SCHMIDT PATENT LAW, INC.

(57) ABSTRACT

Solar trackers that may be advantageously employed on sloped and/or variable terrain to rotate solar panels to track motion of the sun across the sky include bearing assemblies and other mechanical features configured to address mechanical challenges posed by the sloped and/or variable terrain that might otherwise prevent or complicate use of solar trackers on such terrain.

19 Claims, 17 Drawing Sheets

(51) Int. Cl.

| | |
|---|---|
| *F16C 11/04* | (2006.01) |
| *F16C 17/02* | (2006.01) |
| *F16C 17/04* | (2006.01) |
| *F16C 17/10* | (2006.01) |
| *F16C 33/20* | (2006.01) |
| *F16M 11/10* | (2006.01) |
| *F24S 25/13* | (2018.01) |
| *F24S 25/30* | (2018.01) |
| *F24S 25/60* | (2018.01) |
| *F24S 25/634* | (2018.01) |
| *F24S 25/70* | (2018.01) |
| *F24S 30/40* | (2018.01) |
| *F24S 30/425* | (2018.01) |
| *F24S 50/20* | (2018.01) |
| *G01S 3/781* | (2006.01) |
| *G01S 3/786* | (2006.01) |
| *H02K 7/08* | (2006.01) |
| *H02S 30/10* | (2014.01) |
| *F24S 30/00* | (2018.01) |

(52) U.S. Cl.
CPC ............ *F24S 30/425* (2018.05); *F24S 50/20* (2018.05); *G01S 3/781* (2013.01); *G01S 3/7861* (2013.01); *H02K 7/08* (2013.01); *H02S 30/10* (2014.12); *F24S 2025/6004* (2018.05); *F24S 2030/11* (2018.05); *F24S 2030/12* (2018.05); *F24S 2030/131* (2018.05); *F24S 2030/136* (2018.05); *F24S 2030/15* (2018.05); *Y02E 10/47* (2013.01); *Y02E 10/50* (2013.01)

(56) References Cited

U.S. PATENT DOCUMENTS

| | | | | |
|---|---|---|---|---|
| 8,893,445 | B2 | 11/2014 | Yen | |
| 10,174,970 | B2* | 1/2019 | Grushkowitz | F24S 30/425 |
| 10,771,007 | B2* | 9/2020 | Corio | F16F 15/022 |
| 10,944,354 | B2* | 3/2021 | Ballentine | H02S 30/10 |
| 11,480,643 | B2* | 10/2022 | Pesce | F16M 11/12 |
| 11,515,832 | B2* | 11/2022 | Taha | F16M 11/10 |
| 11,558,008 | B2* | 1/2023 | Taha | F24S 50/20 |
| 11,581,845 | B2* | 2/2023 | Taha | G01S 3/781 |
| 11,626,832 | B2* | 4/2023 | Taha | G01S 3/7861 |
| | | | | 248/226.11 |
| 11,716,051 | B2* | 8/2023 | Taha | F16C 17/107 |
| | | | | 136/246 |
| 11,757,402 | B2* | 9/2023 | Taha | H02S 30/10 |
| | | | | 136/246 |
| 11,955,924 | B2* | 4/2024 | Jacobs | H02S 20/32 |
| 11,967,920 | B2* | 4/2024 | Taha | G01S 3/7861 |
| 2011/0023940 | A1 | 2/2011 | Do et al. | |
| 2012/0180845 | A1 | 7/2012 | Cole et al. | |
| 2013/0019921 | A1 | 1/2013 | Au | |
| 2013/0341294 | A1 | 12/2013 | Reynolds et al. | |
| 2014/0026940 | A1 | 1/2014 | Alonso Salmeron et al. | |
| 2014/0054433 | A1 | 2/2014 | Reisch et al. | |
| 2014/0290716 | A1 | 10/2014 | Stubbs | |
| 2014/0338659 | A1 | 11/2014 | Corio | |
| 2015/0234031 | A1 | 8/2015 | Corio | |
| 2015/0316639 | A1 | 11/2015 | Russ et al. | |
| 2017/0102168 | A1 | 4/2017 | Childress | |
| 2017/0229998 | A1 | 8/2017 | Molina et al. | |
| 2017/0234580 | A1 | 8/2017 | Worden | |
| 2017/0366133 | A1 | 12/2017 | Taha et al. | |
| 2018/0073773 | A1 | 3/2018 | Grushkowitz et al. | |
| 2018/0226915 | A1 | 8/2018 | Henderson et al. | |
| 2020/0076355 | A1 | 3/2020 | Hudson et al. | |
| 2020/0373878 | A1 | 11/2020 | Smith | |
| 2021/0194418 | A1* | 6/2021 | Ballentine | H02S 20/32 |
| 2022/0052636 | A1* | 2/2022 | Au | F24S 30/425 |
| 2022/0149773 | A1* | 5/2022 | Reznar | F16C 23/046 |

FOREIGN PATENT DOCUMENTS

| | | |
|---|---|---|
| CN | 107965930 A | 4/2018 |
| IT | UB20 160 641 A1 | 10/2017 |
| KR | 20100030033 A | 3/2010 |
| KR | 20110050799 A | 5/2011 |
| KR | 20190143615 A1 | 12/2019 |
| WO | 2011/123740 A1 | 10/2011 |
| WO | 2018/075368 A1 | 4/2018 |
| WO | 2018/237050 A1 | 12/2018 |

OTHER PUBLICATIONS

Communication and Search Results pursuant to Rule 164(2)(b) and Article 94(3) EPC, corresponding to EP21851884.3 dated Mar. 20, 2025, 10 pages.
Machine translation, CN203788228U, Aug. 20, 2014, Hangzhou Versol Solar Co Ltd.
Machine translation, CN107965930A, Apr. 27, 2018, Suzhou Kingsun Solar Tech Co Ltd.
Machine translation, CN106533343A, Mar. 22, 2017, Jsolar Inc.
Non-Final Office Action, U.S. Appl. No. 17/549,652, dated Nov. 30, 2022, 14 pages.

* cited by examiner

MECHANICAL STOP ASSEMBLY

CROSS REFERENCE TO RELATED APPLICATIONS

The application claims priority to U.S. Provisional Patent Application 63/125,333 titled "Variable Terrain Solar Tracker" filed Dec. 14, 2020. This application is related to U.S. Nonprovisional patent application Ser. No. 17/549,644 titled "Integrated Bearing Assembly" filed on Dec. 13, 2021 (U.S. Pat. No. 11,581,845), to U.S. Nonprovisional patent application Ser. No. 17/549,646 titled "Row-End Cantilevered Beam Module Support" filed on Dec. 13, 2021 (U.S. Pat. No. 11,558,008), to U.S. Nonprovisional patent application Ser. No. 17/549,648 titled "Integrated Articulated Bearing" filed on Dec. 13, 2021 (U.S. Pat. No. 11,757,402), to U.S. Nonprovisional patent application Ser. No. 17/549,652 titled "Flexure Bearing Assembly" filed on Dec. 13, 2021 (U.S. Pat. No. 11,716,051), to U.S. Nonprovisional patent application Ser. No. 17/549,655 titled "Thrust Surface Bearing" filed on Dec. 13, 2021 (U.S. Pat. No. 11,515,832), to U.S. Nonprovisional patent application Ser. No. 17/549,657 titled "Outboard Flexure Bearing Assembly" filed on Dec. 13, 2021 (U.S. Pat. No. 11,967,920), and to U.S. Nonprovisional patent application Ser. No. 17/549,659 titled "Module Clip" filed on Dec. 13, 2021 (U.S. Pat. No. 11,626,832). All of the above-mentioned applications are incorporated herein by reference in their entirety.

FIELD OF THE INVENTION

The invention relates generally to solar trackers.

BACKGROUND

Two types of mounting systems are widely used for mounting solar panels. Fixed tilt mounting structures support solar panels in a fixed position. The efficiency with which panels supported in this manner generate electricity can vary significantly during the course of a day, as the sun moves across the sky and illuminates the fixed panels more or less effectively. However, fixed tilt solar panel mounting structures may be mechanically simple and inexpensive, and in ground-mounted installations may be arranged relatively easily on sloped and/or uneven terrain.

Single axis tracker solar panel mounting structures allow rotation of the panels about an axis to partially track the motion of the sun across the sky. For example, a single axis tracker may be arranged with its rotation axis oriented generally North-South, so that rotation of the panels around the axis can track the East-West component of the sun's daily motion. Alternatively, a single axis tracker may be arranged with its rotation axis oriented generally East-West, so that rotation of the panels around the axis can track the North-South component of the sun's daily (and seasonal) motion. Solar panels supported by single axis trackers can generate significantly more power than comparable panels arranged in a fixed position.

A difficulty with conventional single-axis trackers is that ground mount installations may require significant grading and a relatively flat parcel of land for the trackers to be easily arranged and operated. For example, the distance between a single rotation axis extending over uneven terrain and the ground below would vary along the length of the rotation axis, mechanically complicating installation and operation of the tracker. Further, for a conventional single axis tracker arranged on sloping land with its rotation axis oriented at an angle to the horizontal, a single supporting structure (e.g., support post) may be required to support a force (slope load) that has accumulated along the length of the rotation axis from the weight of the tracker. For example, the slope load may be entirely born by the post at the lowest end of the axis, or by the post at the highest end of the axis, or by a centrally located slew drive support post. These difficulties with conventional single-axis trackers are particularly disadvantageous in view of the increased power generation for a single-axis tracker installed on a sun-facing slope such as a South-facing slope.

Another difficulty with conventional single-axis trackers is that forces from wind loading can accumulate along the length of the row resulting in high loads within the row structure. Drive systems such as slewing drives, linear actuators, and other devices can provide a rigid structure within the row to resist wind loads. However, deploying these components on tracker rows is expensive, and there is a desire to limit the deployment of these components to the bare minimum. Therefore, as single-axis tracker rows increase in length, the wind loads that may accumulate along them can become quite high necessitating much stronger steel components to resist the loads.

Another difficulty with conventional single-axis trackers is that they often comprise long lengths of steel that must be connected to form the strongback that the solar modules are mounted on. This connection often happens between bearing assemblies that are themselves mounted on top of support foundations, as well as to the faces of drive assemblies such as slewing drives. The connection point is managed by bringing the ends of successive torque tubes together after passing them through the bearings on top of foundations, and then aligning them and clamping them together with some type of coupler mechanism, or by bolting one end to the face of a drive assembly. This process of aligning the torque tubes in the bearings, passing them through, and then connecting them takes multiple steps that are time consuming, dangerous, and which can require heavy lifting equipment.

Another difficulty with conventional single-axis trackers is that they are designed to accommodate flat sites with little variation along the length of the torque tube from foundation to foundation.

Another difficulty with conventional single-axis trackers is that they are designed for finite numbers of modules to be mounted between foundations. This can result in extra superstructure being required to add as little as one more module if the maximum number of modules is exceeded on the existing structure.

Another difficulty with conventional single-axis trackers is that their natural harmonics can be excited by wind. The long torque tubes used in conventional single-axis trackers easily transmit natural harmonics driven by wind forces and create difficulty in dampening those forces. Without a method to dampen the natural harmonics, it is possible that the trackers may experience runaway conditions as the amplitude of the oscillations at the natural harmonics increase and result in significant damage to the tracker structure.

A further challenge with many single-axis solar trackers is that they are very long, comprising many solar modules to spread out the cost of the expensive actuators and controls used to rotate each row. This creates challenges on non-sun-facing slopes such as a north-facing slope in the northern hemisphere. On a north-facing slope in the northern hemisphere, a single-axis tracker is at a disadvantage because the modules along its length will be tilted to the north away from the sun for some, much, or all of the year, which may reduce power generation.

Consequently, there is a need for an improved solar panel mounting structure that can be installed on flat, sloped and/or uneven terrain and provide for single axis rotation of solar panels.

SUMMARY

Single axis solar trackers presented in this disclosure may be advantageously employed on flat, sloped and/or variable terrain to rotate solar panels to track motion of the sun across the sky. These trackers, and rows or arrays of these trackers, may include bearing assemblies and other mechanical features configured to address mechanical challenges posed by sloped and/or variable terrain that might otherwise prevent or complicate use of solar trackers on such terrain. The bearing assemblies and other mechanical features may additionally or instead address other mechanical challenges arising from use of single axis trackers, and / or provide other advantages.

One aspect of the invention provides an integrated articulated bearing assembly incorporating a flexible coupling as described in detail below.

Another aspect of the invention provides an integrated straight bearing assembly as described in detail below.

In some variations, the solar tracker straight and/or articulating bearing assembly incorporates brackets at either end that are open in the axial direction of rotation and the vertical direction at some rotation angle of the straight and/or articulating bearing assembly. In some variations, the solar tracker straight and/or articulating bearing assembly resists rotation due to frictional force exerted on it by its housing.

Another aspect of the invention provides flexure bearing assemblies. An articulated bearing assembly as summarized above and described in more detail below allows tremendous articulation for changes in angle of incoming and outgoing torque tubes. However, that level of articulation is not often necessary. An alternative approach is to integrate one of the bearing supports with the two support brackets to eliminate the costly second bearing support. Another alternative approach is to integrate both bearing supports with the two support brackets, and use a straight shaft, to fit to terrain with little variation. These designs rely on vertical slots in the two support brackets to allow the integrated bearing support to tilt. The bearing support on the other side can still articulate to allow a change in the incoming and outgoing angles in the vertical direction, and slots on top of the bearing supports can still allow the bearing assembly to be installed at an angle to the foundation and to allow a change in incoming and outgoing angle in the plane of the two torque tubes. Both torque tube cradles, and the flexibility built into the rest of the bearing assembly, can allow further articulation to accommodate differences in incoming and outgoing angles of the associated torque tubes.

Yet another alternative approach to using an articulated bearing assembly is a flexure bearing assembly that uses a flex plate in the center of the bearing assembly in place of a Hooke joint, or cardan joint, or other articulating joint, so that there are no rotating bearing surfaces within the joint and instead the angular changes are permitted by flexure of an intermediate plate. That intermediate plate may incorporate various features to reduce stress points along its surface such as radiused contact plates, overload springs, force distributing washers for the fasteners, a combination of these items, and other items obvious to one skilled in the art of material stress analysis, reduction, and optimization. This design may also include an integrated bearing support on one side of the bearing assembly to reduce the overall cost and complexity of the product. The coupling devices (e.g., cradles) and other features within the bearing assembly may provide additional flexure to allow angular changes between incoming and outgoing torque tubes.

Another aspect of the invention provides an outboard flexure bearing assembly as described in detail below.

Another aspect of the invention provides a bearing with integrated thrust surfaces and frictional damping as described in detail below.

Another aspect of the invention provides a mechanical stop that can limit the rotation of a row of single axis trackers at certain tilt angles and provide another point of resistance to reduce the distance along which wind loading may accumulate. A unique feature of single-axis trackers it that wind loads tend to force them to rotate vertically no matter which directly the wind is blowing from, and no matter which direction the row is tilted. This may create a situation where the direction of rotation of a single-axis tracker row will rotate can be expected, and a mechanical stop can be installed on the row to provide additional rigid points to resist rotation from wind load in that expected direction, and thus reduce wind forces accumulating along the structure. The mechanical stop may comprise a bracket attached to the rotation assembly that will contact a support foundation when tilted to a certain angle. That angle may be selected so that when it is achieved by rotating the tracker it results in a physical stop that resists further rotation of the tracker.

Another aspect of the invention integrates a coupling device (e.g., a receiving cradle) for the ends of each torque tube onto the bearing assemblies themselves. This eliminates the need to pass the torque tubes through the bearing assemblies, and instead allows them to be dropped into place with a receiving cradle for the ends of each torque tube integrated to the bearing assemblies. This shifts the coupler from being in between foundations to being "at" each foundation. A sight hole can be added into the sides of these receiving cradles to visually identify where the ends of the torque tube are to facilitate assembly and to ensure the torque tube length selected is sufficiently engaged in the cradle to resist the wind load design criteria for the location. This reduces the total number of individual assemblies on each tracker row, simplifies the method of installing and securing the torque tubes, and reduces the time necessary to install and align a torque tube. This approach also allows the material in the coupling components to fulfill multiple roles beyond just that of coupling torque tubes together by also allowing their surfaces to be used as bearings, or as interfaces to bearings. The end result is fewer assemblies being required to assemble a single-axis tracker resulting in less material, less labor, and lower overall costs.

Another aspect of the invention breaks the torque tubes into discrete sections so that they can be supported by flexible bearing assemblies. This allows the torque tubes to more closely follow the natural terrain and to limit or eliminate the amount of land grading required. A further development of this approach is to build flexibility into what appears to be a straight bearing assembly. The bearing shaft, and/or the coupling mechanisms connecting the receiving mechanism to the bearing shaft, and/or the torque tube receiving mechanisms, and/or the clamps that hold the torque tubes into the receiving mechanisms can allow articulation of the torque tube through flexibility of the components, and through gaps left in the components to allow movement. In addition, because the torque tube is now not continuous through the bearing assembly, the end of the torque tube can more easily twist and shift in the receiving mechanism to tilt to a more preferred angle to reach the next foundation. In total, a bearing assembly that appears to be rigid can now allow slope changes purely through designing flexibility and play into the design. A further benefit of this design is that when it is used at the end of a row, a cantilevered beam may be bolted on to the outgoing side to accommodate one or more extra solar modules without requiring another foundation and bearing assembly.

Another aspect of the invention is to attach a cantilevered beam to the outboard side of the ultimate bearing assembly (an end bearing assembly in a row) to accommodate one or more extra solar panel modules without requiring another foundation and bearing assembly.

Another aspect of the invention is to prevent or reduce excitation of the natural harmonics of the trackers by wind forces by breaking the torque tube into smaller discrete sections so that it is more difficult to transfer those natural harmonics along the length of the row for reasons that may include, but are not limited to, rigid bearing assemblies and angle changes through flexible bearings that function as nodes that shorten the wavelengths of the tracker structure to reduce the sensitivity to dynamics excited by wind loading. These nodes also reduce the transmission of certain non-rotational dynamic responses so that those wavelengths cannot travel along the length of the structure causing damage to the structure. Additionally, friction dampers may be integrated into bearing assemblies to dampen the harmonics. Other methods may be used to attenuate the harmonics by creating slip joints and play in the structure that do not allow perfect transmission of the harmonic waves through the structure.

Another aspect of the invention provides a stepped solar module mounting system (module clip) that fastens two module edges at one, or only one module edge if at the end of a module mounting structure within the tracker. The stepped module mounting system lifts one end of the module to point it more directly towards the sun throughout the day and throughout the year. For instance, in the northern hemisphere, on a tracker mounted on flat land, the stepped module mounting system would lift the north end of the module in comparison to the south end of the module so that the module is tilted to the south for better exposure to the sun throughout the year. Additional benefits of a tilted module bracket may include convectional cooling when the module is mostly horizontal in the middle of the day by allowing hot air to rise along the bottom of the module and spill out of the top part of the module to be replaced by cooler air being pulled into the lower portion of the module by the vacuum created by the exiting hot air. Another benefit of a tilted module is that airflow disruption may result during windy conditions that may break the laminar effects on the top and bottom of the module that can cause differential pressures that can force the modules to oscillate around the torque tube, potentially imparting high overturning forces on the torque tubes. These overturning forces also place high loads on the rest of the structure, and alternating attachment and detachment of the laminar flow can cause wind dynamics such as vortex shedding that can excite natural harmonics in the structure that can lead to damage. By lifting the edges of the modules and purposefully disrupting the airflow across the surfaces of the solar modules, these destructive attaching and detaching flows may be interrupted over some or all of the tracker row so that the oscillating forces are reduced in frequency or severity or both. Additional bracket and air disrupters may be attached between the modules to further aid in detaching laminar flow over the modules.

Another aspect of the invention is integration of coupling devices, necessary for connecting the ends of torque tubes, with rotational bearing features so that the coupling devices become part of a bearing assembly. This allows the material in the coupling components to fulfill multiple roles beyond just that of coupling torque tubes together by also allowing their surfaces to be used as bearings, or as interfaces to bearings. The end result is fewer assemblies being required to assemble a single-axis tracker resulting in less material, less labor, and lower overall costs.

According to an embodiment of the invention, there is a tracker comprising: a bearing assembly configured for clockwise rotation around a first axis and counterclockwise rotation around the first axis; an impact surface structure coupled to the bearing assembly and comprising an impact surface; an impact bracket assembly coupled to the bearing assembly and configured to contact the impact surface of the impact surface structure to stop at least one of the clockwise rotation of the bearing assembly around the first axis at a first maximum angle of rotation and the counterclockwise rotation of the bearing assembly around the first axis at a second maximum angle of rotation; a solar module mounting structure coupled to the bearing assembly and configured to rotate with the bearing assembly around the first axis; and a solar module attached to the solar module mounting structure.

The tracker may have wherein the impact surface structure is a foundation supporting the bearing assembly.

The tracker may have wherein the impact surface of the impact surface structure is a bar on the foundation arranged to contact the impact bracket assembly to stop at least one of the clockwise rotation of the bearing assembly around the first axis at a first maximum angle of rotation and the counterclockwise rotation of the bearing assembly around the first axis at a second maximum angle of rotation.

The tracker may have wherein the impact bracket assembly comprises two plates extending parallel to each other in a first direction and comprising an attachment end and an opposite end to the attachment end, the two plates attached at the attachment end to the bearing assembly, the impact bracket assembly comprising an impact bar extending in a second direction perpendicular to the first direction to be between and to connect the opposite ends of the two plates, the impact bar configured to contact the impact surface of the foundation to stop at least one of the clockwise rotation of the bearing assembly around the first axis at a first maximum angle of rotation and the counterclockwise rotation of the bearing assembly around the first axis at a second maximum angle of rotation.

The tracker may have wherein the impact bracket assembly comprises two plates extending parallel to each other in a first direction and each comprising an attachment region at a midpoint and two opposing ends, the two plates attached at the attachment region to the bearing assembly, the impact bracket assembly comprising two impact bars extending in a second direction perpendicular to the first direction to be between and to connect facing ones of the two opposing ends of the two plates to each other, one of the two impact bars configured to contact the impact surface of the foundation to stop the clockwise rotation of the bearing assembly around the first axis at a first maximum angle of rotation and an other of the two impact bars configured to contact the impact surface of the foundation to stop the counterclockwise rotation of the bearing assembly around the first axis at a second maximum angle of rotation.

The tracker may have wherein the solar module mounting structure is a torque tube.

The tracker may have wherein the torque tube has a rectangular or round cross-section.

The tracker may have wherein the impact bracket assembly comprises plates each respectively comprising a hole arranged to accommodate at least one cable or a cable-supporting bracket.

The tracker may have wherein the bearing assembly comprises a bearing support, at least one bearing attached to the bearing support, and a shaft attached to the at least one bearing and extending along the first axis.

The tracker may have wherein the bearing support comprises bearing slots arranged to allow the at least one bearing to move such that the shaft is rotated around a second axis perpendicular to the first axis.

The tracker may have wherein the bearing assembly is a straight bearing assembly and the shaft is a straight bearing shaft, and the at least one bearing is attached to the bearing support and the straight bearing shaft.

The tracker may have wherein the bearing is a flexure bearing assembly comprising a flexure plate configured to allow flexing of the flexure bearing assembly about a third axis perpendicular to the first axis.

The tracker may have wherein the bearing is an articulated bearing assembly comprising an articulating joint.

According to an embodiment, there is an impact bracket assembly comprising: a bearing assembly configured to be coupled to an impact surface structure and configured for clockwise rotation around a first axis and counterclockwise rotation around the first axis; two plates extending parallel to each other in a first direction and comprising an attachment end and an opposite end to the attachment end, the two plates attached at the attachment end to the bearing assembly; and an impact bar extending in a second direction perpendicular to the first direction to connect and be between and the opposite ends of the two plates, the impact bar configured to contact the impact surface structure to stop at least one of the clockwise rotation of the bearing assembly around the first axis at a first maximum angle of rotation and the counterclockwise rotation of the bearing assembly around the first axis at a second maximum angle of rotation.

The impact bracket assembly may have wherein the bearing assembly comprises a bearing support, at least one bearing attached to the bearing support, and a shaft attached to the at least one bearing and extending along the first axis.

The impact bracket assembly may have wherein the bearing support comprises bearing slots arranged to allow the at least one bearing to move such that the shaft is rotated around a second axis perpendicular with the first axis.

The impact bracket assembly may have wherein the bearing assembly is a straight bearing assembly, and the at least one bearing comprises two bearings attached to the bearing support and the shaft.

The impact bracket assembly may have wherein the bearing is a flexure bearing assembly comprising a flexure plate configured to allow flexing of the flexure bearing assembly about a third axis perpendicular to the first axis.

The impact bracket assembly may have wherein the bearing is an articulated bearing assembly comprising an articulating joint.

The impact bracket assembly may have wherein the impact bracket assembly comprises a cradle that secures the solar module mounting structure to the impact bracket assembly, and the cradle comprises a sight hole arranged to allow sight of an end the solar module mounting structure secured in the cradle.

According to an embodiment of the invention, there is an integrated bearing assembly comprising: an integrated bearing support comprising a metal plate folded to form at least one bearing support panel and at least one side panel extending away from at least one bearing support panel; at least one bearing attached to the at least one bearing support panel of the integrated bearing support; a shaft extending through the at least one bearing; and a solar module mounting structure coupler coupled to the shaft.

The integrated bearing assembly may have wherein the at least one bearing comprises two bearings attached to the at least one bearing support panel of the integrated bearing support.

The integrated bearing assembly may have wherein the at least one bearing is plastic.

The integrated bearing assembly may have wherein the shaft extends along a first axis, and the at least one bearing support panel comprises bearing support slots arranged to allow the at least one bearing to move such that the shaft is rotated around a second axis perpendicular with the first axis.

The integrated bearing assembly may have wherein: the at least one bearing comprises two bearings attached to the at least one bearing support panel of the integrated bearing support, and the bearing support slots comprise four bearing support slots, with one of the two bearings fastened to two of the four bearing support slots and another one of the two bearings fastened to another two of the four bearing support slots.

The integrated bearing assembly may have wherein the at least one side panel of the integrated bearing support comprises one or more adjustment slots configured to tilt the integrated bearing assembly on a foundation.

The integrated bearing assembly may have wherein the at least one side panel in the integrated bearing support comprises two side panels disposed on opposing sides of the at least one bearing support panel.

The integrated bearing assembly may have wherein the at least one side panel in the integrated bearing support extends perpendicular to the at least one bearing support panel.

The integrated bearing assembly may have wherein: the at least one bearing support panel comprises two bearing support panels, and the at least one bearing comprises two bearings attached to the at least one bearing support panel of the integrated bearing support, the two bearings attached to respective ones of the two bearing support panels.

The integrated bearing assembly may be further comprising a first cradle coupled to the shaft and configured to support an end of a solar module mounting structure.

The integrated bearing assembly may be further comprising a cradle clamp configured to secure the solar module mounting structure to the cradle while reducing harmonics transferred through the solar module mounting structure.

The integrated bearing assembly may be further comprising fasteners and a retention hook each securing the cradle clamp to the first cradle.

The integrated bearing assembly may have wherein the cradle clamp comprises a sight hole configured to allow sight of an end of the solar module mounting structure secured in the first cradle.

The integrated bearing assembly may be further comprising a second cradle coupled to the shaft and configured to support a solar module mounting structure and disposed on an opposite side of shaft to the first cradle.

The integrated bearing assembly may have wherein the shaft extends along a first axis, and the shaft is configured to flex along a second axis perpendicular with the first axis.

The integrated bearing assembly may be further comprising two cradles coupled to and disposed on opposing sides of the shaft and each configured to support a solar module mounting structure, wherein: the at least one bearing comprises two bearings attached to the at least one bearing support panel of the integrated bearing support; the at least one bearing support panel comprises two bearing support panels; the shaft extends along a first axis, and the two bearing support panels each comprises bearing support slots arranged to allow the two bearings to move such that the shaft is rotated around a second axis coplanar and non-parallel with the first axis; the at least one side panel in the integrated bearing support comprises two side panels disposed on opposing sides of the at least one bearing support panel and extending perpendicular to the at least one bearing support panel.

According to an embodiment, there is a tracker comprising: at least one integrated bearing assembly each comprising: a foundation; an integrated bearing support mounted on the foundation and comprising a metal plate folded to form at least one bearing support panel and at least one side panel; at least one bearing attached to the metal plate; a shaft extending through the at least one bearing; at least one solar module mounting structure coupler coupled to the shaft; and a solar module mounting structure attached to the at least one solar module mounting structure coupler.

The tracker may have wherein: the at least one solar module mounting structure coupler comprises two solar module mounting structure couplers coupled to and disposed on opposing sides of the shaft and each configured to support a solar module mounting structure; the at least one bearing comprises two bearings attached to the at least one bearing support panel of the integrated bearing support; the at least one bearing support panel comprises two bearing support panels; and the at least one side panel in the integrated bearing support comprises two side panels disposed on opposing sides of the at least one bearing support panel and extending perpendicular to the at least one bearing support panel.

The tracker may be further comprising a first solar module, wherein: the at least one integrated bearing assembly comprises a first integrated bearing assembly and a second integrated bearing assembly, the first solar module extends in a first direction and is coupled to and disposed between the first integrated bearing assembly and the second integrated bearing assembly, and the shaft of the second integrated bearing assembly extends in a second direction different from the first direction.

The tracker may be further comprising a second solar module coupled to the second integrated bearing assembly opposite the first solar module and extending in the first direction.

According to an embodiment of the invention, there is a tracker comprising: a foundation; and a cantilevered beam support mounted on the foundation, the cantilevered beam support comprising: a bearing assembly mounted on the foundation a cantilevered solar module mounting structure having a first end attached to the bearing assembly and an opposite end that is unsupported; a solar module mounted on the cantilevered solar module mounting structure.

The tracker may have wherein the bearing assembly is configured for clockwise rotation around a first axis and counterclockwise rotation around the first axis, and the cantilevered solar module mounting structure is configured to rotate with the bearing assembly around the first axis.

The tracker may have wherein the cantilevered beam support further comprises an impact bracket assembly coupled to the bearing assembly and configured to contact the foundation to stop at least one of the clockwise rotation of the bearing assembly around the first axis at a first maximum angle of rotation and the counterclockwise rotation of the bearing assembly around the first axis at a second maximum angle of rotation.

The tracker may have wherein the impact bracket assembly is configured to contact the foundation to stop the clockwise rotation of the bearing assembly around the first axis at a first maximum angle of rotation and to contact the foundation to stop the counterclockwise rotation of the bearing assembly around the first axis at a second maximum angle of rotation.

The tracker may have wherein the bearing assembly is a straight bearing assembly comprising two bearings and a straight bearing shaft through the two bearings.

The tracker may have wherein the bearing assembly is an articulating bearing assembly comprising an articulating joint.

The tracker may have wherein the bearing assembly is a flexure bearing assembly comprising a flexure plate configured to allow flexing of the flexure bearing assembly about a third axis perpendicular to the first axis.

The tracker may have wherein the bearing assembly comprises a bearing support panel, a shaft, and at least one bearing, the bearing support panel comprising bearing support slots arranged to allow the at least one bearing to move such that the shaft is rotated around a second axis coplanar and non-parallel with the first axis.

The tracker may have wherein the cantilevered solar module mounting structure is a torque tube.

The tracker may have wherein the torque tube has a rectangular cross-section.

The tracker may have wherein the cantilevered beam support further comprises a module attachment bracket attaching the solar module to the torque tube.

The tracker may have wherein the bearing assembly comprises a first cradle supporting an end of the torque tube and a first clamp securing the torque tube to the first cradle.

The tracker may have wherein the bearing assembly comprises a second cradle and a second clamp on an opposite end of the bearing assembly to the first cradle and the first clamp.

The tracker may be further comprising a second foundation and a second solar module mounting structure, the second solar module mounting structure having a first end coupled to the bearing assembly and a second end coupled to the second foundation.

The tracker may have wherein the second foundation and the foundation are a same height.

The tracker may have wherein the cantilevered beam support is one end of the tracker and the second foundation is an opposite end of the tracker.

The tracker may have wherein the solar module mounting structure has a shorter length then the second solar module mounting structure.

The tracker may have wherein the second solar module mounting structure is configured to mount eight or more solar modules and the solar module mounting structure is configured to mount only one of the solar module.

The tracker may be further comprising a slew drive configured to drive rotation of the cantilevered solar module mounting structure.

The tracker may have wherein the cantilevered solar module mounting structure does not extend over the foundation.

According to an embodiment of the invention, there is an integrated bearing assembly comprising: an integrated bearing support comprising a metal plate folded to form a bearing support panel and two side panels on opposite sides of the bearing support panel each extending away from the bearing support panel in a same direction, the two side panels each comprising a pivot point that together define a pivot axis; a pivoting bearing support attached to each the two side panels at the pivot point and configured to pivot around the pivot axis; a first bearing attached to the bearing support panel; a second bearing attached to the pivoting bearing support; and a flexible joint coupling the first bearing and the second bearing.

The integrated bearing assembly may have wherein the first bearing and second bearing are plastic.

The integrated bearing assembly may have wherein a first portion of the integrated bearing support comprising the first bearing is capable of rotating about a first rotation axis and a second portion of the integrated bearing support comprising the second bearing is capable of rotating about a second rotation axis.

The integrated bearing assembly may have wherein the flexible joint is an articulating joint having a joint pivot point where the first rotation axis and a second rotation axis intersect, and an orientation of the first rotation axis relative to the second rotation axis is variable around the pivot point.

The integrated bearing assembly may have at least one of the bearing support panel and the pivoting bearing support comprises bearing support slots arranged to allow at least one of the first bearing and the second bearing to swivel about a swivel axis perpendicular to a plane of the bearing support panel.

The integrated bearing assembly may have wherein the bearing support panel and the pivoting bearing support each comprise the bearing support slots.

The integrated bearing assembly may have wherein at least one of the two side panels of the integrated bearing support comprises adjustment slots configured to tilt the integrated bearing assembly on a foundation.

The integrated bearing assembly may have wherein the two side panels are each perpendicular to the at least one bearing support panel.

The integrated bearing assembly may have wherein each of the first bearing and the second bearing are secured to the flexible joint by a bearing strap.

The integrated bearing assembly may be further comprising a first solar module mounting structure coupled to the flexible joint.

The integrated bearing assembly may be further comprising a second solar module mounting structure coupled to the flexible joint on an opposite side to the first solar module mounting structure, wherein the first solar module mounting structure is arranged to pivot around the pivot axis with the pivoting bearing support while the second solar module mounting structure is arranged to not pivot around the pivot axis with the pivoting bearing support.

The integrated bearing assembly may be further comprising a first coupler coupled to the flexible joint and configured to support an end of a first solar module mounting structure.

The integrated bearing assembly may be further comprising a cradle clamp configured to secure the solar module mounting structure to the first coupler while reducing harmonics transferred through the solar module mounting structure, wherein the first coupler is a cradle.

The integrated bearing assembly may have wherein the cradle clamp comprises a sight hole configured to allow sight of an end of the solar module mounting structure secured in the first cradle.

The integrated bearing assembly may be further comprising a second coupler coupled to the flexible joint on an opposite side of the first coupler and configured to support an end of a second solar module mounting structure.

The integrated bearing assembly may have wherein: the articulating joint comprises a first shaft along the first rotation axis and a second shaft along the second rotation axis disposed on opposite sides of the joint pivot point; the first bearing is secured to the first shaft by a first bearing strap and the second bearing is secured to the second shaft by a second bearing shaft; the first shaft is attached to a first cradle configured to support an end of a first solar module mounting structure, and the second shaft is attached to a second cradle configured to support an end of a second solar module mounting structure; and the first shaft is arranged to pivot around the pivot axis with the pivoting bearing support while the second shaft is arranged on the bearing support panel so as to not pivot around the pivot axis with the pivoting bearing support.

According to an embodiment of the invention, there is a tracker comprising: a foundation; an integrated bearing assembly comprising: an integrated bearing support comprising a metal plate folded to form a bearing support panel and two side panels on opposite sides of the bearing support panel each extending away from the bearing support panel in a same direction, the two side panels each comprising a pivot point that together define a pivot axis; a pivoting bearing support attached to each of the two side panels at the pivot point and configured to pivot around the pivot axis; a flexible joint coupled to the pivoting bearing support; and at solar module mounting coupler coupled to the flexible joint; and a solar mounting module structure supported by the solar module mounting coupler.

The tracker may have wherein the solar module mounting coupler is a cradle and the solar mounting module structure is a torque tube with a square cross section.

The tracker may have wherein: a first portion of the integrated bearing support is capable of rotating about a first rotation axis and a second portion of the integrated bearing support is capable of rotating about a second rotation axis; the flexible joint is an articulating joint having a joint pivot point where the first rotation axis and a second rotation axis intersect, and an orientation of the first rotation axis relative to the second rotation axis is variable around the pivot point.

The tracker may be further comprising a first bearing attached to the bearing support panel and a second bearing attached to the pivoting bearing support.

According to an embodiment of the invention, there is a flexure assembly comprising: a first mating plate and a second mating plate, the first mating plate defining a first axis and the second mating plate defining a second axis different from the first axis; a flex plate attached to and disposed between the first mating plate and the second mating plate, the flex plate configured to flex around the first axis defined by the first mating plate and flex around the second axis defined by the second mating plate; and a first bearing coupled to the first mating plate and a second bearing coupled to the second mating plate.

The flexure assembly may have wherein each of the first mating plate and the second mating plate have a length that is a respectively longest side, the length of the first mating plate and the second mating plate being perpendicular to each other.

The flexure assembly may have wherein the first mating plate and the second mating plate have a rectangular shape.

The flexure assembly may have wherein the flex plate is a different shape than the first mating plate and the second mating plate.

The flexure assembly may have wherein the flex plate has an octagon shape.

The flexure assembly may have wherein the first mating plate is attached to a first stub shaft and the second mating plate is attached to a second stub shaft.

The flexure assembly may have wherein the first stub shaft is perpendicular to a plane of the first mating plate and the second stub shaft is perpendicular to a plane of the second mating plate.

The flexure assembly may have wherein the first bearing is attached to the first stub shaft and the second bearing is attached to the second stub shaft.

The flexure assembly may have wherein the first bearing and the second bearing are plastic.

The flexure assembly may have wherein a first solar module mounting structure coupler is attached to the first stub shaft and configured to support an end of a first solar module mounting structure, and a second solar module mounting structure coupler is attached to the second stub shaft and configured to support an end of a second solar module mounting structure.

The flexure assembly may have wherein the first solar module mounting structure coupler is a cradle and has a sight hole configured to allow sight of an end of the first solar module mounting structure supported in the cradle.

The flexure assembly may be further comprising a first overload spring between the first mating plate and the flex plate and a second overload spring between the second mating plate and the flex plate.

The flexure assembly may be further comprising a third overload spring between the first mating plate and the flex plate and a fourth overload spring between the second mating plate and the flex plate.

The flexure assembly may be further comprising fasteners attaching the first and second mating plate to the flex plate, each of the fasteners attached to force distributing washers.

The flexure assembly may have wherein the flex plate and the first and second mating plate are disposed on a bearing support comprising: two bearing support panels; and two side panels.

The flexure assembly may have wherein the first mating plate is attached to a first stub shaft and the second mating plate is attached to a second stub shaft, the first stub shaft and the second stub shaft each extend along a third axis, and the two bearing support panels comprise bearing support slots arranged to allow the first bearing and the second bearing to move such that the first stub shaft and the second stub shaft are rotated around a fourth axis perpendicular with the second axis.

The flexure assembly may have wherein the two side panels of the integrated bearing support comprise adjustment slots arranged to allow tilting the flexure bearing assembly on a foundation supporting the bearing support.

The flexure assembly may be further comprising a spacer between the first mating plate and the flex plate.

According to an embodiment of the invention, there is a tracker comprising: a foundation; a flexure assembly mounted on the foundation and comprising: a first solar module mounting structure coupler; a first mating plate coupled to the first solar module mounting structure coupler and defining a first axis, a second mating plate defining a second axis different from the first axis; a flex plate disposed between and attached to the first mating plate and the second mating plate, the flex plate configured to flex around the first axis defined by the first mating plate and flex around the second axis defined by the second mating plate; and a first bearing coupled to the first mating plate and a second bearing coupled to the second mating plate, a first solar module mounting structure supported by the first solar module mounting structure coupler.

The tracker may be further comprising a second cradle coupled to the second mating plate and a second torque tube supported by the second cradle, wherein the first solar module mounting structure coupler is a first cradle and the first solar module mounting structure is a first torque tube.

According to an embodiment of the invention, there is a bearing assembly comprising: a shaft; one or more bearings in direct contact with the shaft and comprising a first bearing thrust surface; one or more bearing straps securing the one or more bearing to the shaft; a first thrust surface in direct contact with the first bearing thrust surface of the one or more bearings; wherein the one or more bearings and the one or more bearing straps are configured to provide frictional load on the shaft to dampen natural harmonics transmitted through the shaft.

The bearing assembly may be further comprising a first solar module mounting structure coupler comprising the first thrust surface and configured to support a first solar module mounting structure coupler.

The bearing assembly may be further comprising a second solar module mounting structure coupler comprising a second thrust surface and configured to support a second solar module mounting structure, wherein the one or more bearings comprises a second bearing thrust surface in direct contact with the second thrust surface.

The bearing assembly may have wherein the one or more bearings consists of one bearing comprising one end comprising the first bearing thrust surface and an opposite end comprising the second bearing thrust surface, the one or more bearing straps consists of one bearing strap.

The bearing assembly may have wherein the one bearing is substantially a same length as the shaft.

The bearing assembly may have wherein one end of the shaft is attached to the first solar module mounting structure coupler and an opposite end of the shaft is attached to the second solar module mounting structure coupler.

The bearing assembly may be further comprising a bearing support with a bearing support panel and side panels extending away from the bearing support panel, the bearing support panel supporting the one bearing.

The bearing assembly may have wherein the shaft extends along a first axis, and the bearing support panel comprises pivot slots arranged to allow the one bearing to move such that the shaft is rotated around a second axis perpendicular to the first axis.

The bearing assembly may have wherein the shaft has equal diameter throughout a length of the shaft.

The bearing assembly may have wherein the side panels of the bearing support comprise adjustment slots arranged to allow tilting the bearing assembly on a foundation supporting the bearing support.

The bearing assembly may have wherein the one or more bearing consists of a first bearing and a second bearing, and the one or more bearing straps consists of a first bearing strap securing the first bearing to the shaft and a second bearing strap securing the second bearing to the shaft.

The bearing assembly may have wherein: the first bearing comprises the first bearing thrust surface and a second bearing thrust surface, the second bearing comprises a third bearing thrust surface and a fourth bearing thrust surface, and the shaft comprises the first thrust surface, a second thrust surface in direct contact with the second bearing thrust surface of the first bearing, a third thrust surface in direct contact with the third bearing thrust surface of the second bearing, and a fourth thrust surface in direct contact with the fourth bearing thrust surface of the second bearing.

The bearing assembly may have wherein a middle portion of the shaft has a larger diameter than portions of the shaft in direct contact with the first bearing or the second bearing.

The bearing assembly may be further comprising bearing support with two bearing support panels and side panels extending away from the two bearing support panels, the two bearing support panels supporting the first bearing and the second bearing.

The bearing assembly may have wherein the shaft extends along a first axis, and the two bearing support panels comprise pivot slots arranged to allow the first bearing and the second bearing to move such that the shaft is rotated around a second axis perpendicular to the first axis.

The bearing assembly may be further comprising an articulating joint disposed between the first bearing and the second bearing, and a second shaft extending away from the articulating joint and through the second bearing, wherein the shaft extends away from the articulating joint and through the first bearing, The bearing assembly may be further comprising: a flexure device comprising: a flex plate, and two mating plates disposed with the flex plate between them, a second shaft extending away from the articulating joint and through the second bearing, wherein the shaft extends away from the articulating joint and through the first bearing, and wherein the flexure device is disposed between the first bearing and the second bearing.

The bearing assembly may have wherein the one or more bearings is plastic.

According to an embodiment, there is a tracker comprising: a foundation; a bearing assembly mounted on the foundation and comprising: a shaft; one or more bearings coupled with the shaft and comprising a first bearing thrust surface; one or more bearing straps securing the one or more bearing to the shaft; a first thrust surface in direct contact with the first bearing thrust surface of the one or more bearings; and a first solar module mounting structure coupler coupled to the shaft, and a first solar module mounting structure supported.

According to an embodiment, there is a tracker comprising: a foundation; a flexure assembly mounted on the foundation and comprising: a first solar module mounting structure coupler; a first mating plate coupled to the first solar module mounting structure coupler and defining a first axis, a second mating plate defining a second axis different from the first axis; a flex plate disposed between and attached to the first mating plate and the second mating plate, the flex plate configured to flex around the first axis defined by the first mating plate and flex around the second axis defined by the second mating plate; and a first bearing coupled to the first mating plate and a second bearing coupled to the second mating plate, a first solar module mounting structure supported by the first solar module mounting structure coupler.

The tracker may have wherein the one or more bearings and the one or more bearing straps are configured to provide frictional load on the shaft to dampen natural harmonics transmitted through into the shaft via the first solar module mounting structure.

According to an embodiment of the invention, there is an outboard flexure bearing assembly comprising: one or more bearings; a shaft extending through the one or more bearings and comprising a first end and a second end opposite the first end; a first flex plate attached to the first end of the shaft; a second flex plate coupled to the first flex plate; and a first solar module mounting structure coupler coupled to the second flex plate and coupled to the first end of the shaft.

The outboard flexure bearing assembly may have wherein the second flex plate is attached to the first solar module mounting structure coupler. The outboard flexure bearing assembly may have wherein the second flex plate is integral with the first solar module mounting structure coupler.

The outboard flexure bearing assembly may have wherein the first solar module mounting structure coupler comprises a first back area and wings extending out of opposing sides of the first back area, the second flex plate comprising the wings.

The outboard flexure bearing assembly may have wherein first flex plate has a rectangular shape.

The outboard flexure bearing assembly may have wherein the first flex plate and the second flex plate are not in direct contact.

The outboard flexure bearing assembly may have wherein the first flex plate and second flex plate are each configured to flex around a first axis between the first and second flex plate and parallel to a plane of the first flex plate.

The outboard flexure bearing assembly may have wherein the first flex plate and second flex plate are configured to flex around a second axis between the first and second flex plate, parallel to a plane of the first flex plate, and perpendicular to the first axis.

The outboard flexure bearing assembly may be further comprising a second module mounting structure coupler coupled to the second end of the shaft.

The outboard flexure bearing assembly may be further comprising: a third flex plate attached to the second end of the shaft, and a fourth flex plate coupled to the third flex plate and the second module mounting structure coupler.

The outboard flexure bearing assembly may be further comprising bearing straps securing the one or more bearings to the shaft, wherein the one or more bearings consist of two bearings.

The outboard flexure bearing assembly may be further comprising a bearing support supporting the one or more bearings comprising at least one bearing support panel and side panels extending from the at least one bearing support panel.

The outboard flexure bearing assembly may have wherein the shaft extends along a first axis, the at least one bearing support panel comprising pivot slots arranged to allow the one or more bearing to move such that the shaft is rotated around a second axis perpendicular to the first axis.

The outboard flexure bearing assembly may have wherein the side panels comprise adjustment slots arranged to allow tilting the bearing assembly on a foundation supporting the bearing support.

The outboard flexure bearing assembly may be further comprising a middle flex plate between the first flex plate and the third flex plate.

The outboard flexure bearing assembly may have wherein each of the first flex plate and third flex plate have a length that is a respectively longest side, the length of the first flex plate and the second flex plate being perpendicular to each other.

The outboard flexure bearing assembly may have wherein the middle flex plate is an octagon.

According to an embodiment of the invention, there is a tracker: a foundation; an outboard flexure bearing assembly mounted on the foundation and comprising: one or more bearings; a shaft extending comprising a first end and a second end opposite the first end; a first flex plate coupled to the first end of the shaft; a second flex plate coupled to the first flex plate; and a first solar module mounting structure coupler coupled to the second flex plate and coupled to the first end of the shaft; a first solar module mounting structure supported by to the first solar module mounting structure coupler.

The tracker may be further comprising a second solar module mounting structure coupler coupled to the second end of the shaft, and a second solar module mounting structure supported by the second module mounting structure.

The tracker may have wherein the first and second solar module mounting structure are torque tubes, the first and second solar module mounting structure coupler comprise cradles and cradle clamps securing the torque tubes to the cradles.

According to an embodiment of the invention, there is a module clip comprising: a upper portion; a lower portion disposed below the upper portion in a vertical direction, the lower portion and configured to secure a solar module between with the upper portion; and a strap disposed below the lower portion in the vertical direction and configured to secure the module clip to a solar module mounting structure; one or more fasteners extending in the vertical direction and coupling the upper portion to the lower portion to be spaced apart from the lower portion, and coupling the upper portion and the lower portion to the strap.

The module clip may have wherein the upper portion has a flat surface and is slanted at a non-perpendicular with the vertical direction, and the lower portion has a flat surface and is slanted at a non-perpendicular with the vertical direction.

The module clip may have wherein the upper portion has two or more steps and the lower portion has two or more steps.

The module clip may have wherein the upper portion has three steps and lower portion has three steps.

The module clip may have wherein: the three steps of the upper portion comprise a highest step, a middle step, and a lowest step relative to the vertical direction, the three steps of the lower portion comprise a highest step, a middle step, and a lowest step relative to the vertical direction, the one or more fasteners extends through the middle step of the upper portion and the middle step of the lower portion.

The module clip may have wherein the one or more fasteners consists of two fasteners.

The module clip may have wherein the one or more fasteners is in direct contact with the upper portion, the lower portion, and the strap.

The module clip may have wherein: the upper portion has a length that is a longest side extending in a first horizontal direction perpendicular to the vertical direction, the lower portion has a length that is a longest side extending in a first horizontal direction perpendicular to the vertical direction, and the strap is configured to secure the module clip to the solar module mounting structure that extends in a second horizontal direction perpendicular to the first horizontal direction The module clip may have wherein the length of the lower portion is longer than the length of the upper portion.

The module clip may have wherein the strap forms a square shape the lower portion.

According to an embodiment of the invention, there is a clipped solar module comprising: a solar module mounting structure extending in a horizontal direction perpendicular to a vertical direction; a first module clip attached to one end of the torque tube and a second module clip attached to an opposite end of the torque tube, each of the first module clip and the second module clip comprising an upper portion, a lower portion disposed below the upper portion in the vertical direction, one or more module fasteners coupling the upper portion to the lower portion, and a strap; and a solar module disposed above the torque tube in a vertical direction and having one end secured to the first module clip and an opposite end secured to the second module clip.

The clipped solar module may have wherein the solar module is slanted an angle with the solar module mounting structure.

The clipped solar module may have wherein: the upper portion has a higher part in the vertical direction and a lower part in the vertical direction, the lower portion has a higher part in the vertical direction and a lower part in the vertical direction.

The clipped solar module may have wherein the higher part of the upper portion in both the first module clip and the second module clip are facing in a same direction.

The clipped solar module may have wherein the solar module is secured to the higher part of the upper portion and the lower portion of the first module clip and the lower portion of the upper portion and the lower portion of the second module clip.

The clipped solar module may have wherein the upper portion has a flat surface and is slanted to be non-perpendicular to the vertical direction, and the lower portion is slanted to be non-perpendicular to the vertical direction.

The clipped solar module may have wherein the upper portion has two or more steps and lower portion has two or more steps.

The clipped solar module may have wherein the solar module mounting structure is a torque tube The clipped solar module may have wherein the torque tube has a cross-section with a square shape.

According to an embodiment of the invention, there is a tracker comprising: a foundation; a bearing assembly mounted on the foundation and comprising a solar module mounting structure coupler; a solar module mounting structure coupled to the solar module mounting structure coupler; a first module clip attached to one end of the solar module mounting structure and a second module clip attached to an opposite end of the solar module mounting structure, each of the first module clip and the second module clip comprising an upper portion and a lower portion disposed below the upper portion; and a solar module disposed over the solar module mounting structure and having one end secured to the first module clip and an opposite end secured to the second module clip.

These and other embodiments, features and advantages of the present invention will become more apparent to those skilled in the art when taken with reference to the following more detailed description of the invention in conjunction with the accompanying drawings that are first briefly described.

DETAILED DESCRIPTION

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention.

As used in this specification and the appended claims, the singular forms "a," "an," and "the" include plural referents unless the context clearly indicates otherwise. Also, the term "parallel" is intended to mean "substantially parallel" and to encompass minor deviations from parallel geometries. The term "vertical" refers to a direction parallel to the force of the earth's gravity. The term "horizontal" refers to a direction perpendicular to "vertical".

Figure 1:
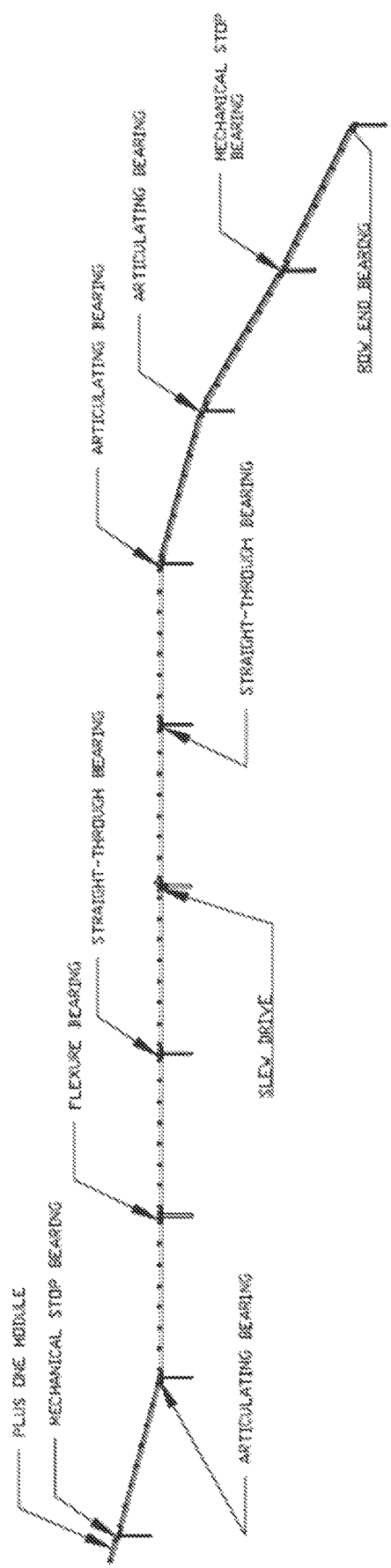
FIG. 1 shows an example of an all-terrain solar tracker arranged on sloped and rolling terrain with angle changes along its length to follow the natural terrain.

FIG. 1 shows an example all-terrain solar tracker arranged on varying terrain with angle changes along its length to follow the natural terrain. This tracker employs examples of many of the components described above in the summary and described in more detail below. These components include a cantilevered beam supporting a "plus one module" at one end of the tracker row, articulated bearings supporting significant changes in angular orientation between adjacent segments of the torque tube, flexure bearings supporting smaller changes in angular orientation between adjacent segments of the torque tube without requiring an articulated bearing, straight through bearings, mechanical stops limiting rotation of the tracker, and a row end bearing. The tracker in addition includes a slew drive configured to drive rotation of the torque tube around its long axes. Although the example of FIG. 1 and other figures shows a particular arrangement of certain components, other variations may employ any suitable combination and arrangement of the components described in this disclosure. Some elements illustrated in certain figures may be unlabelled in those figures and only be labelled in other figures, for convenience and clarity of illustration and to avoid repetition.

Instead of or in addition to torque tubes, any other solar module mounting structures may be used in the trackers and/or devices described in this specification. These solar module mounting structures may be or comprise z-purlins, spaceframes, and other like structures.

Figure 2:
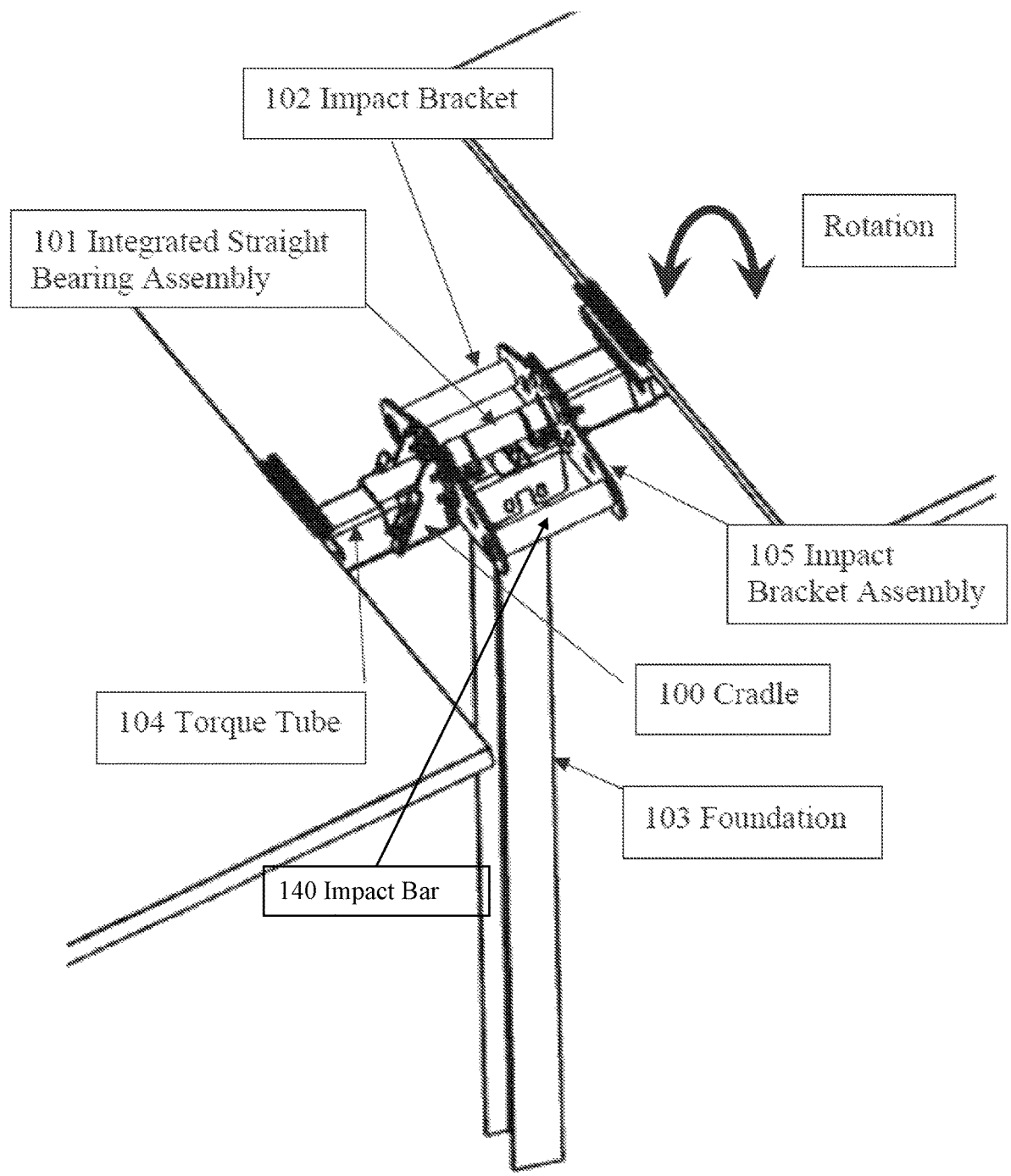
FIG. 2 shows an example of a mechanical stop assembly integrated with a straight bearing assembly. The mechanical stop assembly has two impact brackets that will contact the foundation at a certain tilt angle to resist further rotation of the tracker.

FIG. 2 shows an example of a mechanical stop for a single-axis tracker that incorporates two torque tube cradles 100, one integrated straight bearing assembly 101, two impact brackets 102 on one impact bracket assembly 105, one foundation 103, and one torque tube 104. Torque tubes may be inserted into the cradles on either side of the mechanical stop assembly, and one or the other cradle may be left off if the tracker does not continue in that direction. Torque tubes may be tubes having a cross-section of four or more flat sides, such as a rectangle, square, pentagon, hexagon, and octagon, for example. Torque tubes may have cross sections that are round instead of having flat sides, such as circles or ovals. As mentioned above, since other solar module mounting structures may be used instead of torque tubes, the torque tube cradle may be any attachment structure capable of securing solar modules other than torque tubes specifically. Solar modules may be mounted on the one or more torque tubes and rotated. A mechanical stop assembly may be mounted onto an integrated straight bearing assembly, or other type of bearing assembly (e.g., compact straight bearing assembly, a flexure bearing assembly, articulated bearing assembly, etc.), or provided as a separate and standalone assembly. At some angle, the impact bracket may contact an impact surface structure resulting in a physical blockage to further rotation of the torque tube. The impact surface structure may be the post of the foundation itself or a horizontal bar on the foundation that contacts the impact bracket assembly. The impact bracket assembly might have two parallel plates extending outward without an impact bracket between them so that the plates contact a bar on the foundation, or the plates may include the impact bracket extending between them to contact the foundation to result in the physical blockage. This physical blockage allows rotational loads applied to the torque tube to be resisted at this foundation when tilted to an angle that contact is made. Zero, one, or more mechanical stop assemblies may be incorporated in a tracker row to provide zero, one, or more physical blockages to rotation. If one mechanical stop assembly contacts a foundation before one or more other mechanical stop assemblies contact the foundation, then the one or more other mechanical stop assemblies may still contact the foundation in wind conditions that create sufficient flexing in the torque tube and bearing assemblies in the rest of the tracker system to allow the non-contacting mechanical stops to come into contact with their respective foundation. The mechanical stop assembly illustrated in FIG. 2 has two sides to stop both of a clockwise rotation of the bearing assembly 101 at a first maximum angle of rotation and stop a counterclockwise rotation of the bearing assembly 101 at a second maximum angle of rotation.

Figure 3A:
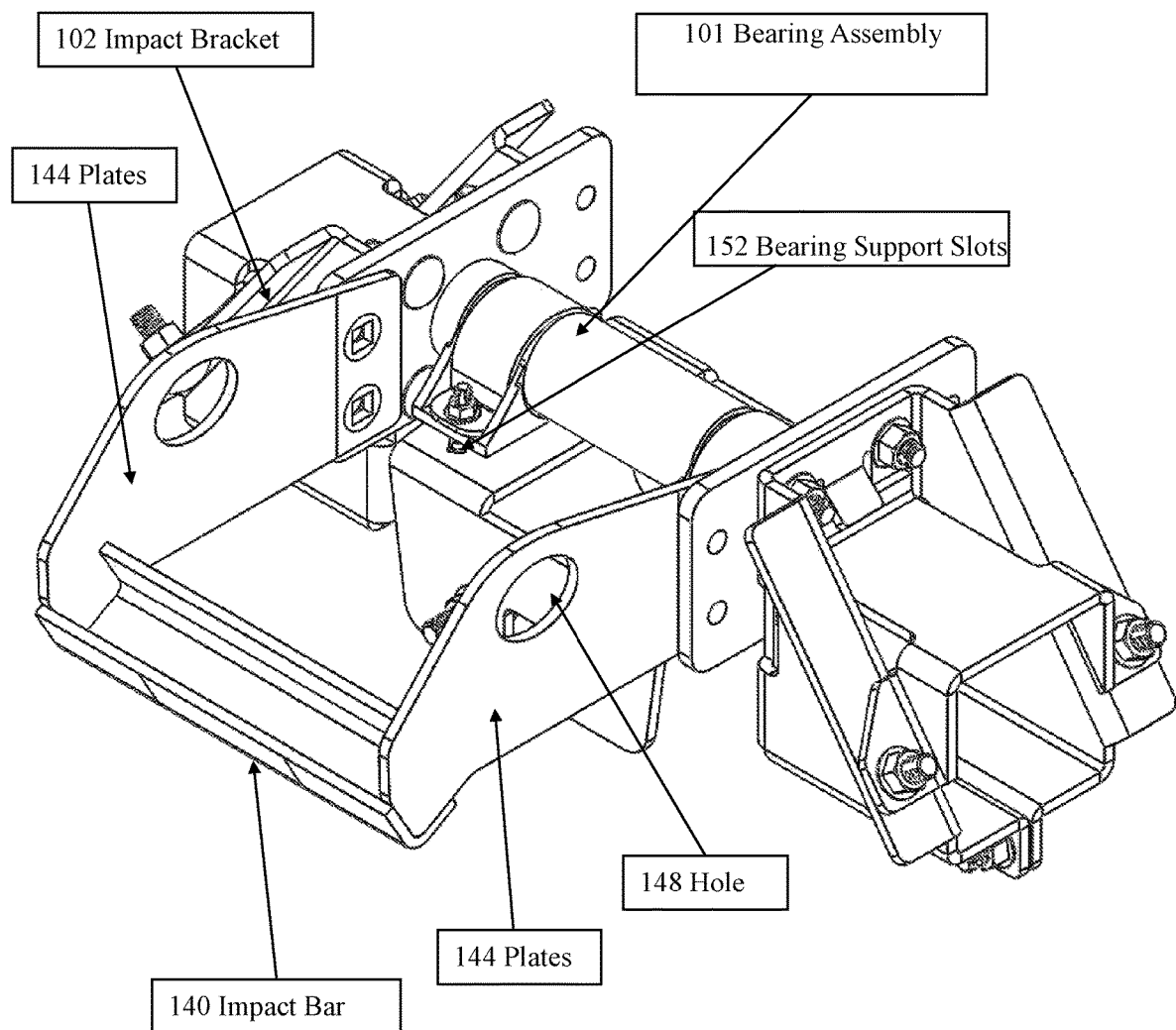
FIGS. 3A and 3B show a perspective view and a plan view of an example of a mechanical stop assembly integrated with a straight bearing assembly. The mechanical stop assembly has one impact bracket that will contact the foundation at a certain tilt angle to resist further rotation of the tracker.
Figure 3B:
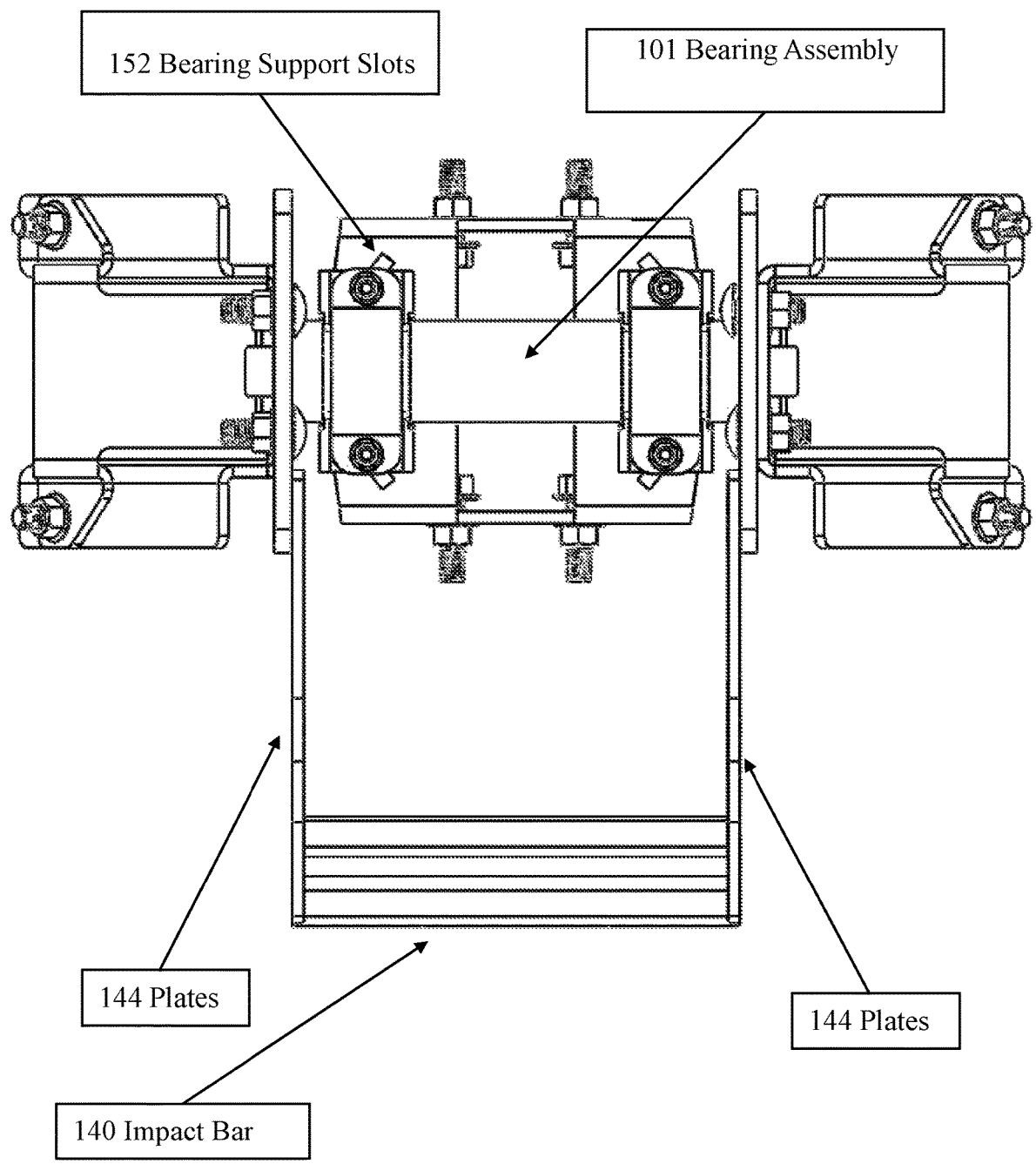

FIGS. 3A and 3B shows a mechanical stop assembly with an impact bracket 102 on only one side of the bearing assembly 101 (rather than the two illustrated in FIG. 2), to stop only one of clockwise or counterclockwise rotation of the bearing assembly 101 at a first maximum angle of rotation. Also illustrated in this figure are two plates 144. The two plates 144 are parallel to each other and have the impact bar 140 between them and perpendicular to their direction of extension. The two plates 144 are attached at an attachment region to the bearing assembly. They can be removed from the bearing assembly and/or mounted at the opposing side of the bearing assembly. The two plates may have a hole 148 that either accommodates cables or accommodates hooks that supports cables in the tracker.

The bearing assembly may comprise a bearing support having bearing support slots 152 that allow pivoting and/or rotation of the bearing about an axis perpendicular to the bearing, e.g. an axis parallel to the long axis of the foundation. For example, the bearing support slots 152 may allow East-West rotation.

Figure 4:
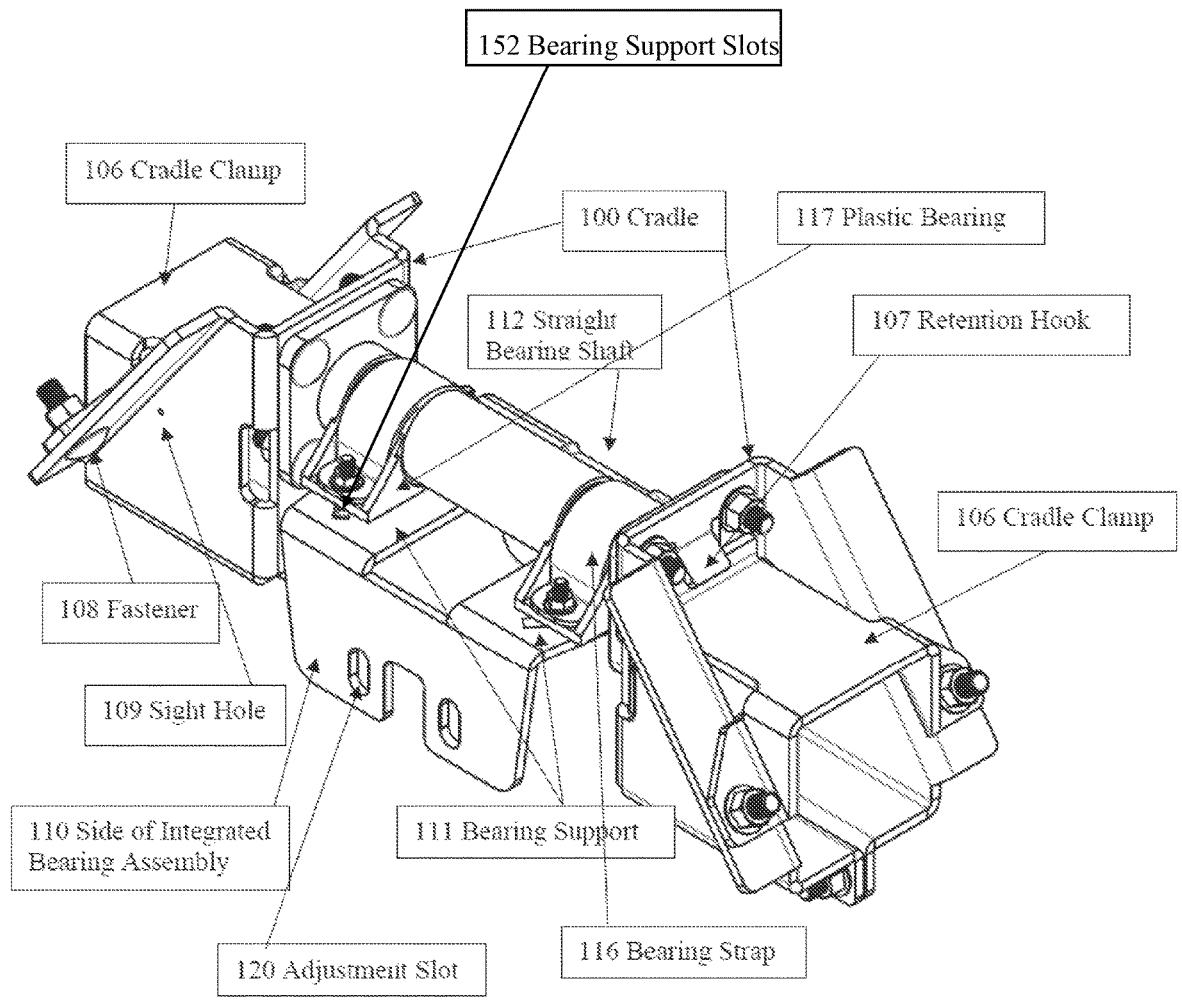
FIG. 4 shows a perspective view of a straight bearing assembly with two cradles and cradle clamps. The straight bearing assembly has a mounting structure that integrates both sides of the assembly with the two bearing supports.

FIG. 4 shows an integrated straight bearing assembly. The integrated bearing assembly includes coupling devices that are typically used on single-axis trackers between foundations to connect the ends of torque tubes together. However, in this application, the coupling devices are integrated to the integrated straight bearing assembly cradles 100. In this application, the cradles 100 are fastened to the straight bearing shaft, which is supported by bearings 117 and restrained by bearing straps 116. There may be one or more bearings 117, e.g., two, and they may be plastic or any other material. The cradles 100 may allow coupling of the integrated bearing assembly with any type of solar module mounting structure, e.g., a torque tube. An integrated bearing assembly may have only one cradle 100 instead of two cradles disposed on opposite sides of the straight bearing shaft. Bearing support slots 152 in the top panel(s) of the integrated bearing assembly may be fastened to the bearings in a way that allows the bearings to swivel. For example, if the straight bearing shaft extends along a first axis, the bearing support slots may allow the bearings to move or swivel in a way that the straight bearing shaft pivots around a second axis coplanar with and non-parallel with the first axis, e.g., perpendicular with the first axis. For example, a solar tracker may have a first and second bearing assembly spaced apart from each other, with a first solar panel module in between them supported by a torque tube, and a second solar panel module extending on the opposite side of the second bearing assembly from the first solar panel module. In this example, the first solar panel module extends in a first direction and the second bearing assembly can extend in a second direction due to the swiveling allowed by the bearing support slots. The second solar panel module fastened to the second bearing assembly can extend in the first direction, in the second direction, or a third direction different from the first and second direction.

Adjustment slot 120 allows the integrated straight bearing assembly to tilt on top of a foundation to best accommodate the incoming and outgoing angles of the torque tubes supported by the cradles 100 on either end of the integrated straight bearing assembly. Each side panel may have any number of adjustment slots 120, e.g., two for each side, for a total of four. The adjustment slots may be any shape, such as the long slit with rounded corners illustrated, or circles or rectangles. The adjustment slots on each side panel may be horizontally disposed from each other as depicted, or may be vertically disposed from each other on the same side panel. For example, one side panel may have a circle adjustment slot vertically disposed over a long slit with rounded corners. Alternate methods could be imagined where the cradle is continuous along the top of the integrated straight bearing assembly with bearings and bearing straps designed to support the profile of the cradle 100, to further eliminate components in the design.

FIG. 4 shows an integrated straight bearing assembly with cradles 100 on either end. In this configuration a cradle clamp 106 is installed on each cradle assembly and captured by a retention hook 107 and two fasteners 108. A torque tube 104, as shown in FIG. 2, can be dropped into the cradles in FIG. 3 so that one end of the torque tube is supported by the cradle 100. A cradle clamp 106 can then be installed to secure the torque tube within the cradle so that it cannot come free by lifting, sliding, or falling out of the vertical opening. Other options may be used to secure the cradle clamp 106 and other cradle clamp designs may be used. The other end of the torque tube may then be supported by a cradle on a succeeding or preceding bearing assembly, or other mounting option. Various bearing assemblies may be used including articulating or flexure bearing assemblies. One or more sight holes 109 may be incorporated in the side of the cradle to allow visual verification of the location of the torque tube. The sight hole may also be located on other parts of the bearing assembly as deemed fit for visual verification of the location of the torque tube within the cradle. Alternatively, the shaft may be directly welded to and integral with the cradle, with part of the shaft protruding through the back of the cradle, such that no retention hook 107 and fasteners 108 are needed. The shaft protruding from the back of the cradle may space apart the torque tube inserted in the cradle from a vertically extending back corner of the cradle, preventing the torque tube from being crushed by the back corner. In other words, the protruding shaft acts as a spacer for the torque tube.

In the example of FIG. 4, both sides 110 of the integrated bearing assembly and both bearing supports 111 are integrated into one single piece of bent metal plate as opposed to being individual and separate components held together by fasteners, welding, or other joining processes. The metal plate may be bent to have two bearing support panels and two side panels extending perpendicular from the two bearing support panels and disposed on opposite sides of the two bearing support panels from each other. One bearing may be disposed on each of the two bearing support panels. Alternatively, the metal plate may have only one bearing support panel and one side panel, or two bearing support panels and one side panel. This assembly has multiple components that can provide flexure and movement to allow the angles of incoming and outgoing torque tubes to differ from each other. The body of the cradle 100 can be designed to flex, as can the cradle clamp 106. Further, the straight bearing shaft 112 can be designed to flex, as can the bearing supports 111 and the side of the integrated bearing assembly 110. For example, if the straight bearing shaft 112 extends along a first axis, the straight bearing shaft 112 can flex about one or multiple axes coplanar and non-parallel with the first axis, e.g., perpendicular with the first axis. The curved slots in the bearing support 111 allow the bearing 117 to rotate around the center of the integrated bearing assembly to accommodate misalignment of the foundation that the integrated bearing assembly is fastened to and the incoming and outgoing torque tubes that are supported by the cradles 100. The bearing 117 may be plastic, or any other suitable material. Movement of a torque tube in the cradle 100 can be designed into the cradle through a variety of methods including tighter fit on the top of the cradle than the bottom, or vice versa, through play allowed in the vertical direction, through sliding allowed in the axial direction, and through play allowed in the horizontal direction. This play allows the torque tubes to move in relation to the cradle 100 and cradle clamp 106 to accommodate differing incoming and outgoing angles of the torque tube. This play also allows natural attenuation of harmonics being transferred through the structure such as with oscillations brought on by blowing wind that causes the structure to shake. A bearing assembly that appears to be rigid can now allow slope changes purely through designing flexibility and play into the design.

Figure 5:
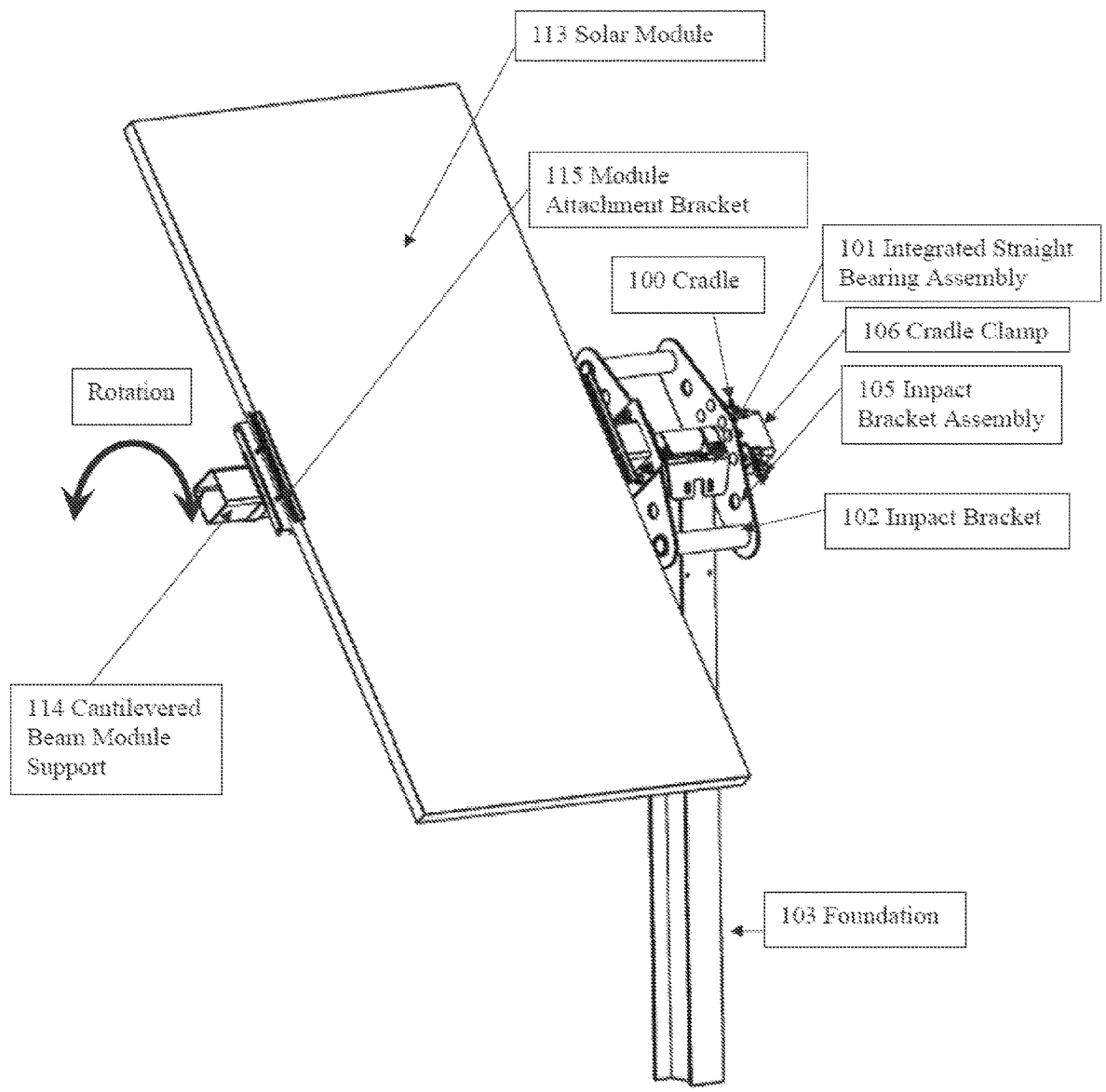
FIG. 5 shows a row-end cantilevered beam module support. This example shows the cantilevered beam bolted on to a mechanical stop assembly. Other bearing designs may be used to support the cantilevered beam assembly.

FIG. 5 shows a cantilevered beam module support 114 to be used at the end of a tracker row to add one or more modules 113 without the need for an additional foundation 103 and bearing assembly 101, particularly when only one or very few solar modules needs to be added to the end of the tracker. The cantilevered beam module support 114 comprises a short section of torque tube with a square plate attached to the end that is then attached to the bearing assembly 101. In this application, a straight bearing assembly 101 with an impact bracket assembly 105 is shown, but other bearing assemblies may also be used such as, but not limited to, straight bearing assembly, articulating bearing assembly, and flexure bearing assembly. Additionally, the impact bracket assembly 105 may have only one impact bracket 102 on one side as described above, rather than the two as illustrated.

The torque tube used at the end of the tracker at the cantilevered beam module support 114 may be shorter than torque tubes used in the rest of the tracker, such as ⅛th or less the length of other torque tubes. If so, the torque tube at the end supports only one solar module rather than, for example, eight solar modules per torque tube.

Figure 6:
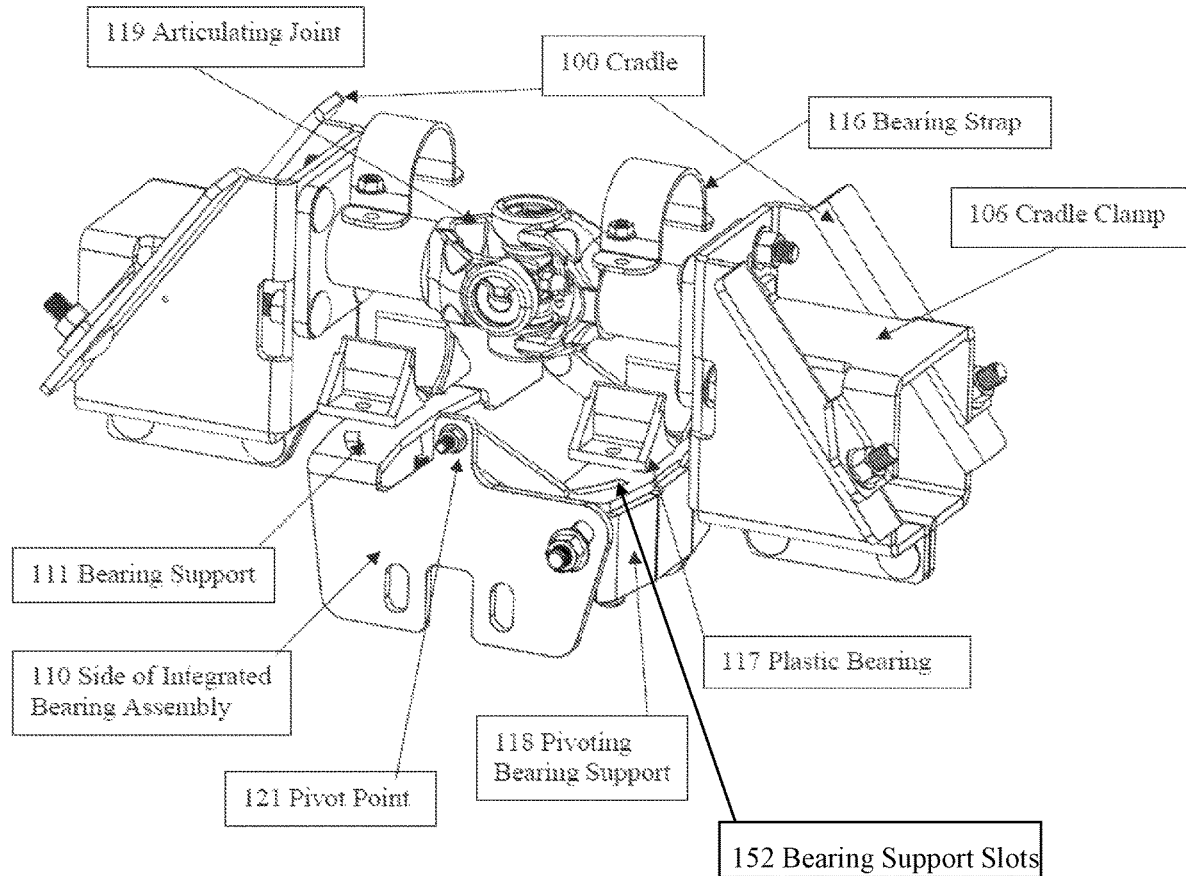
FIG. 6 shows an integrated articulated bearing assembly. Both side supports are integrated with one bearing support while the other bearing support is a separate piece that can swivel independently. The swiveling bearing support includes radius arms for positioning with relation to the structure and the flexible shaft, and are pivoted about a portion of the sides that rise up higher than the integrated bearing support to provide an axis about which to pivot.

FIG. 6 shows an integrated articulated bearing comprising one bracket with two sides 110 integrated with a bearing support 111, a pivoting bearing support 118, two cradles 100, two cradle clamps 106, an articulating joint assembly 119, two bearings 117, and two bearing straps 116. Adjustment slots 120 in the two sides 110 allow the integrated bearing support to tilt on the foundation to achieve the angle of the torque tube that will be clamped in the cradle 100 on that side of the integrated articulated bearing. The pivoting bearing support 118 on the other side can still articulate by pivoting around the pivot point 121 that is coincident with the center of the articulating joint to allow a change in the incoming and outgoing angles in the vertical direction. The bearing support slots 152 on top of both the integrated 111 and pivoting bearing support 118 allow the articulated joint to be installed at an angle to the integrated bearing assembly and to allow a change in incoming and outgoing angle in the plane of the torque tubes supported by either cradle 100. Both torque tube cradles 100, and the flexibility built into the rest of the bearing assembly, can allow further articulation to accommodate differences in incoming and outgoing angles of the associated torque tubes through flexure of the components or gaps between the torque tubes and the cradles 100.

The angle θ between rotation axes of the torque tubes may be, for example, ≥0 degrees, ≥5 degrees, ≥10 degrees, ≥15 degrees, ≥20 degrees, ≥25 degrees, ≥30 degrees, ≥35 degrees, ≥40 degrees, ≥45 degrees, ≥50 degrees, ≥55 degrees, ≥60 degrees, ≥65 degrees, ≥70 degrees, ≥75 degrees, ≥80 degrees, ≥85 degrees, or up to 90 degrees. The angle between a rotation axis of a torque tube and the horizontal may be, for example, ≥0 degrees, ≥5 degrees, ≥10 degrees, ≥15 degrees, ≥20 degrees, ≥25 degrees, ≥30 degrees, ≥35 degrees, ≥40 degrees, ≥45 degrees, ≥50 degrees, ≥55 degrees, ≥60 degrees, ≥65 degrees, ≥70 degrees, ≥75 degrees, ≥80 degrees, ≥85 degrees, or up to 90 degrees. These examples refer to the magnitude of the angle between the rotation axes. The angles may be positive or negative with respect to the horizontal. These rotation axes may intersect at the articulating joint.

Figure 7A:
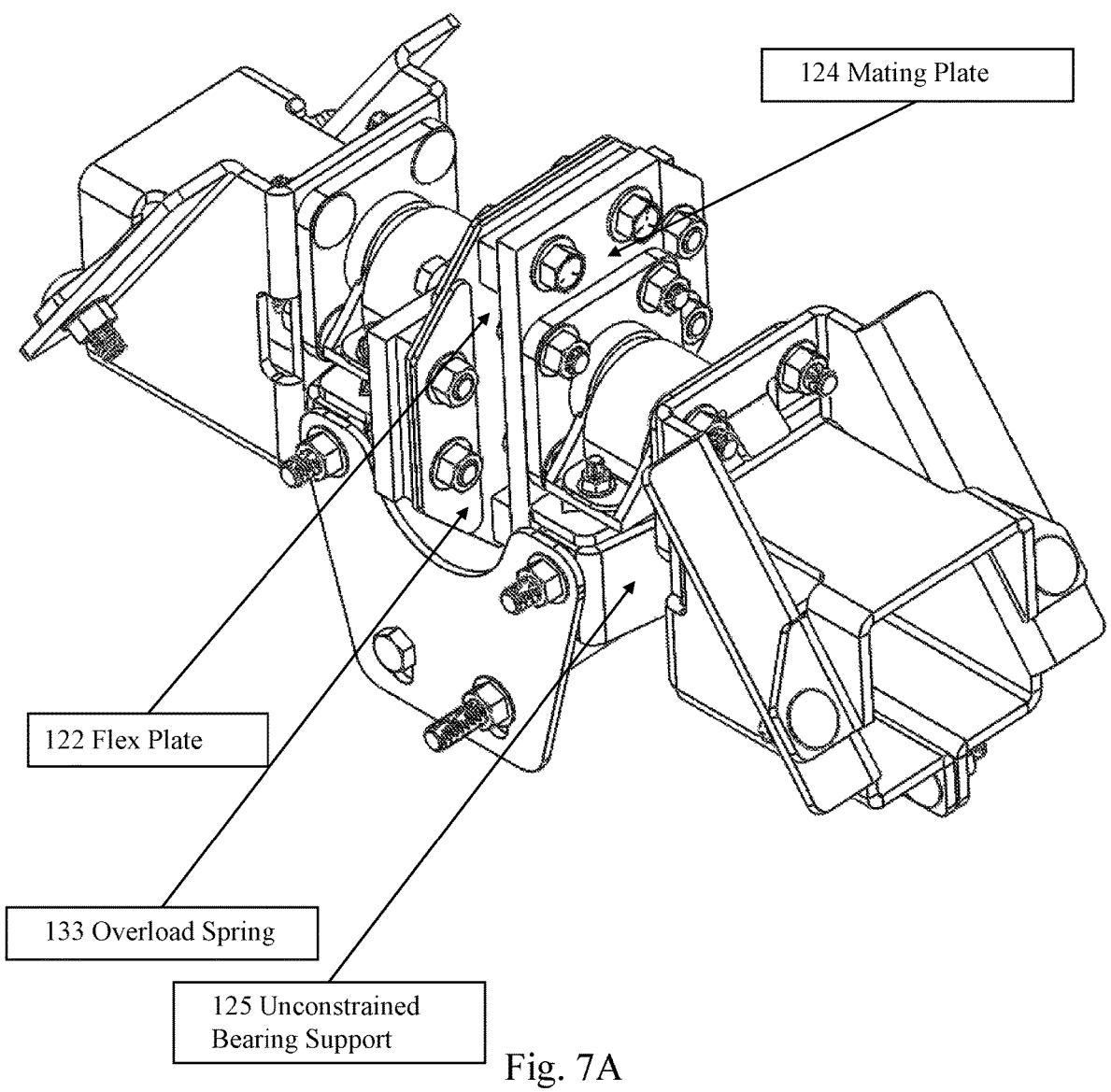
FIGS. 7A, 7B, and 7C show a perspective view, an exploded view, and a side section of a center flex plate bearing assembly.
Figure 7B:
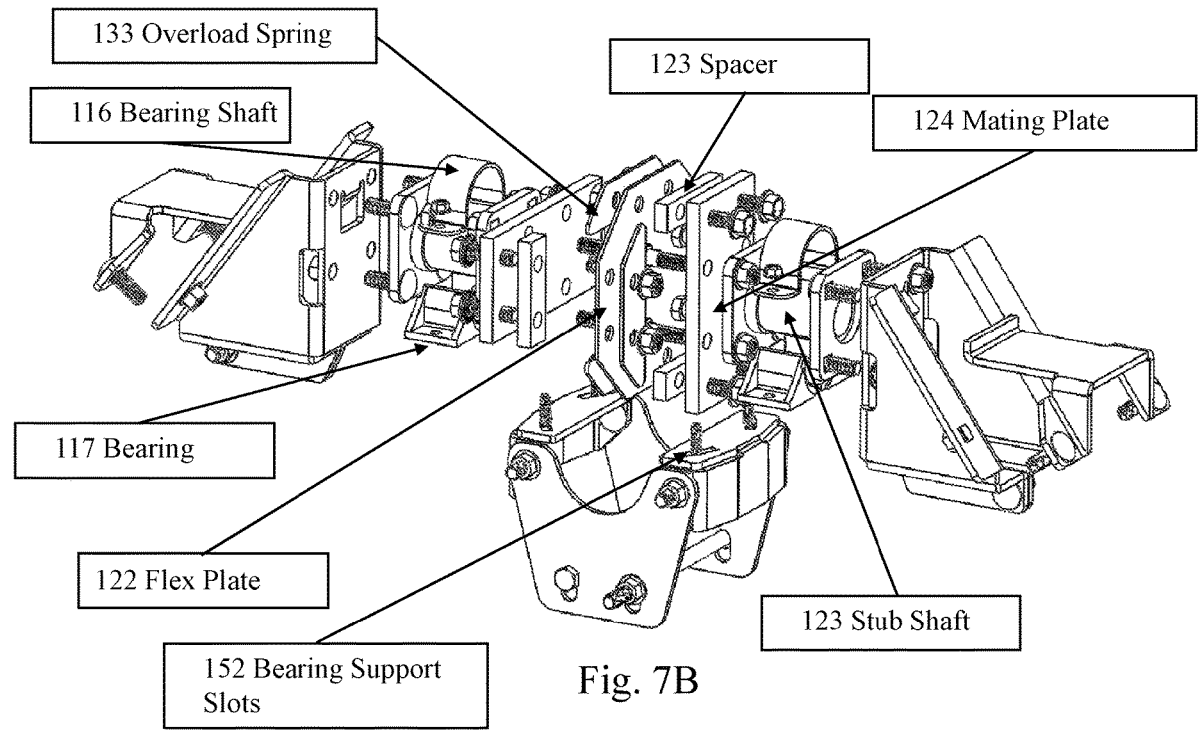
Figure 7C:
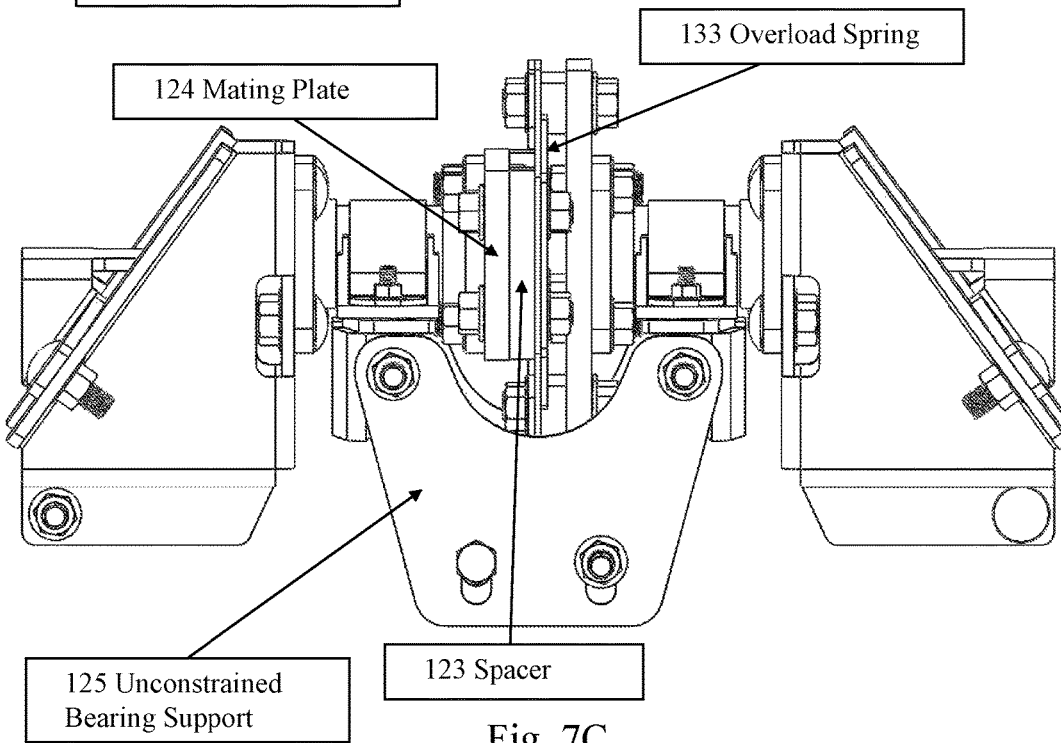

FIG. 7A, 7B, and 7C show a flexure bearing assembly that uses a flex plate 122 in the center of the assembly to allow differing incoming and outgoing angles for the torque tubes supported by the cradles 100. A stub shaft 123 with a mating plate 124 is used to attach the cradle 100 to the flex plate 122. The stub shaft 123 may have a square plate welded and/or fastened to the cradle. Alternatively, the stub shaft 123 may be directly welded to the cradle without the square plate in between. The stub shaft 123 may protrude out the back of the cradle to space the torque tube inserted in the cradle from the curved corner of the cradle, and prevent crushing or cracking of the torque tube by the curved corner. Each of the associated components can provide flexure to allow changes in the incoming and outgoing angles of the torque tubes supported by the cradles 100. In this method, the unconstrained bearing supports 125 are not located with respect to the center of the flexure plate, but could be with the addition of a pivot point 121 feature as shown in FIG. 6. The mating plate 124 may incorporate various features to reduce stress points along its surface such as radiused contact plates, overload springs 133, force distributing washers for the fasteners, a combination of these items, and other items obvious to one skilled in the art of material stress analysis, reduction, and optimization. For example, the overload spring 133 may prevent a bolthead from cracking the flex plate 122. Additionally, a spacer 154 may help the mating plate contact the flex plate 122. The spacer 154 may have its corners that are in contact with the flex plate 122 grinded down into a taper or rounded corner so that the edges contacting the flex plate 122 don't crack the flex plate 122. Alternatively, the mating plate may be bent to contact the flex plate (with similar rounded edges) without a spacer 154 in between. This design may also include an integrated bearing assembly as shown in FIG. 5 on one side of the bearing assembly to reduce the overall cost and complexity of the product.

Figure 8A:
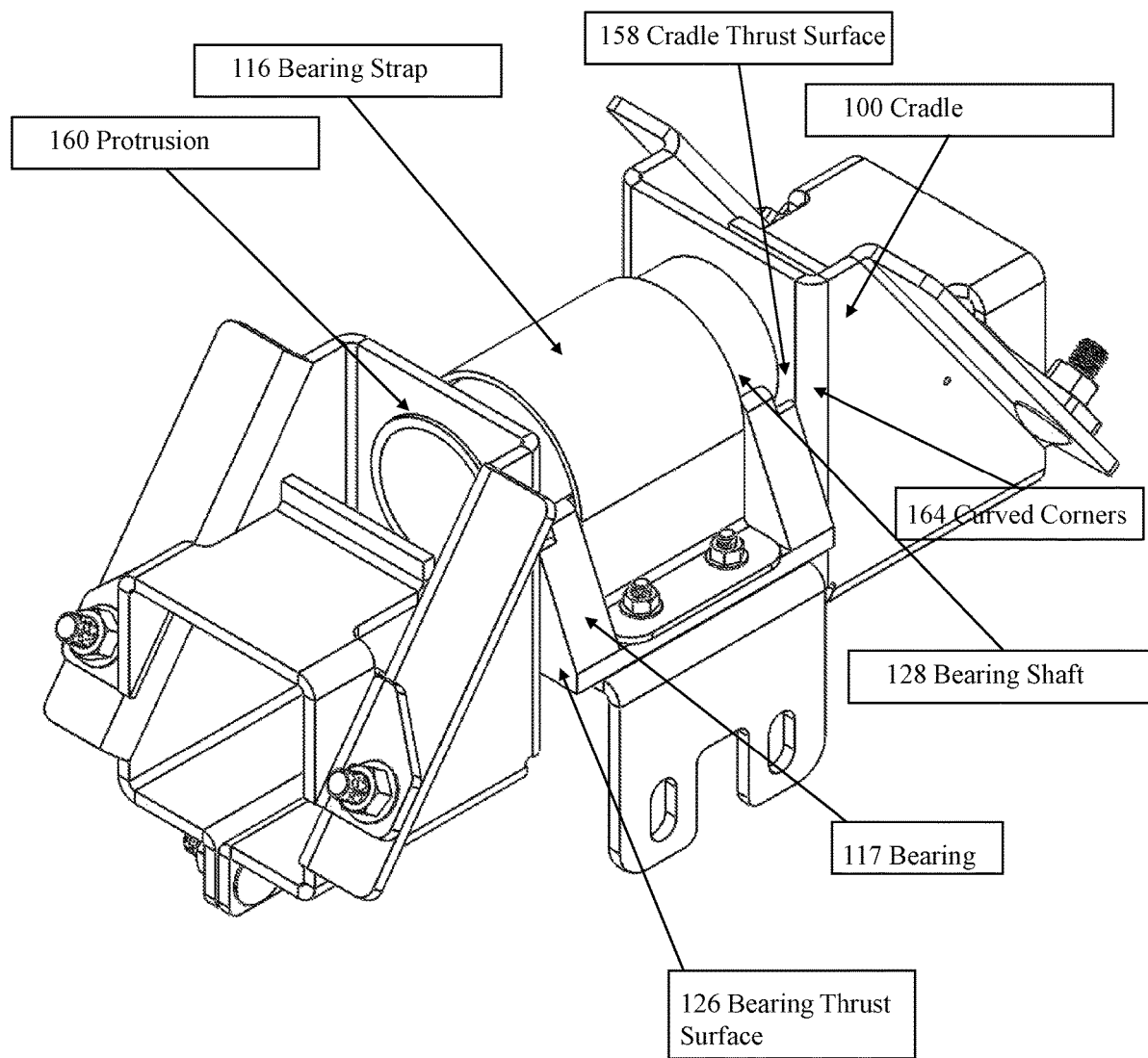
FIGS. 8A, 8B, and 8C show a perspective view, an exploded view, and a side section of the bearing assembly that includes thrust bearing surfaces and a device for frictional damping.
Figure 8B:
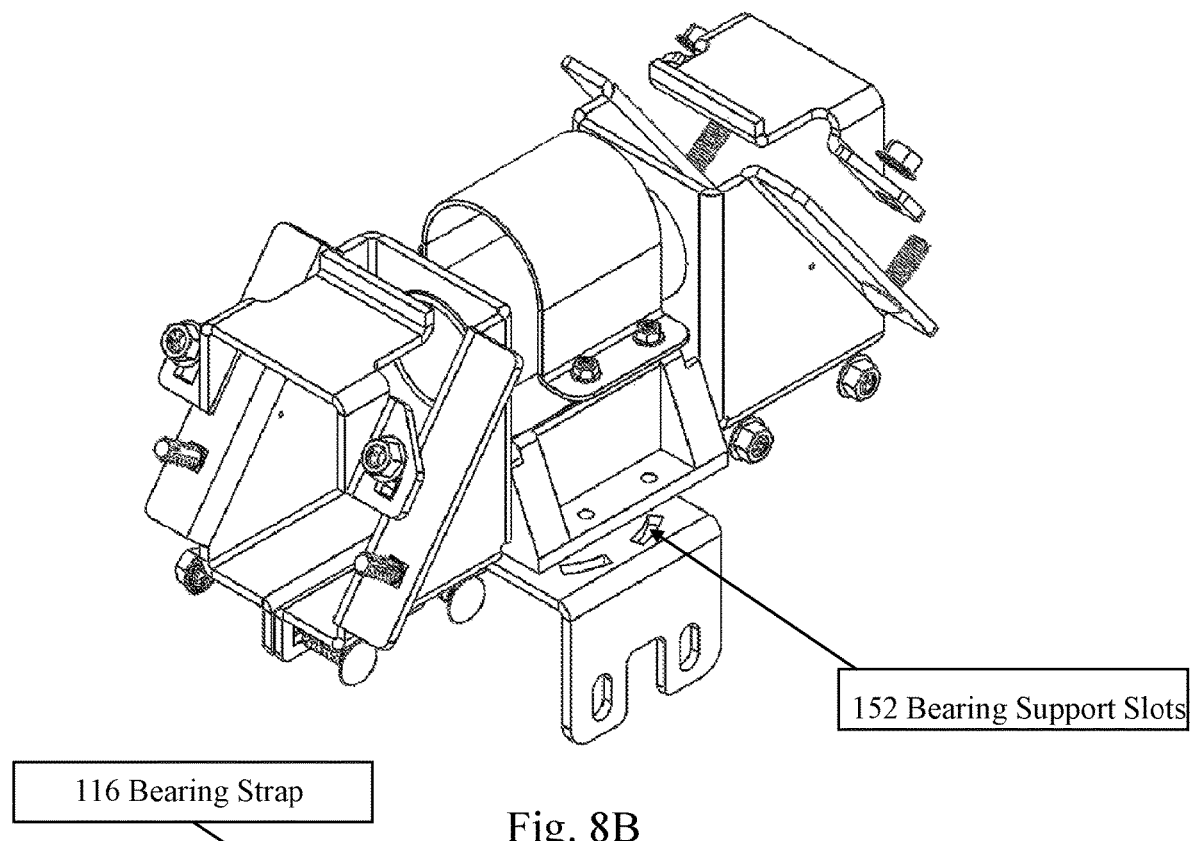
Figure 8C:
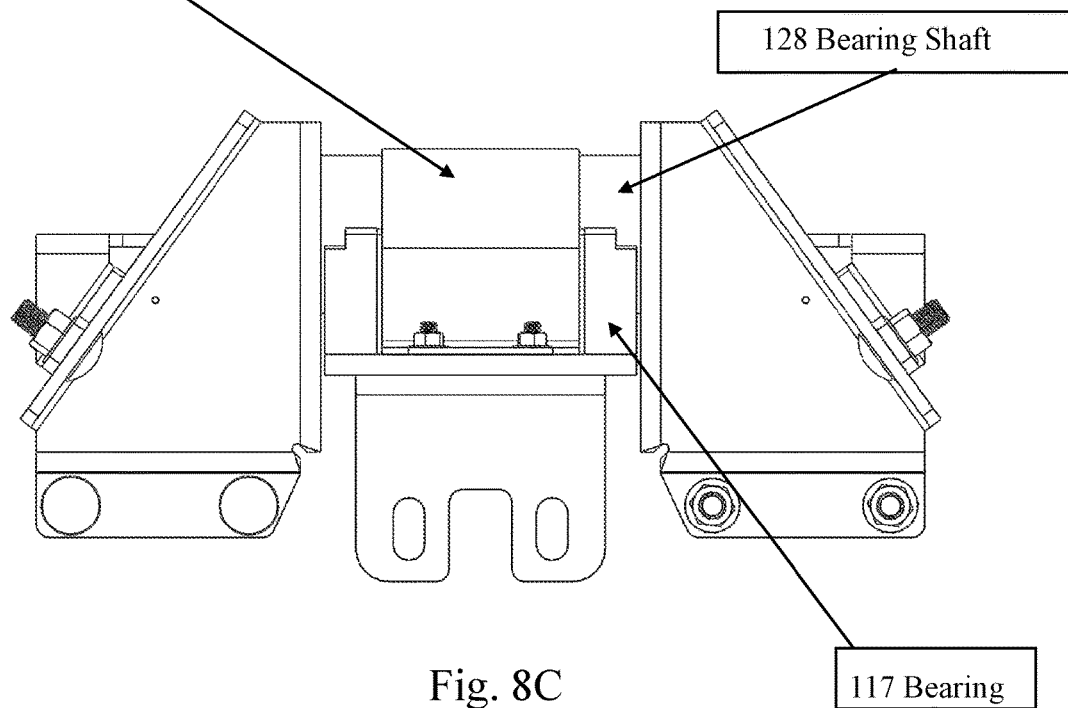

FIG. 8A, 8B, and 8C show a compact bearing assembly with integrated thrust bearing and frictional damping. The bearing shaft 128 may be integral with the cradles, and welded to the back of the cradles to protrude out of the cradle back with a protrusion 160 that spaces the torque tubes from the curved corners of the cradle. A cross section of the bearing shaft 128 may be circular. The shaft 128 may have a same diameter throughout its entirety. A bearing strap 116 may strap the bearing shaft 128 to the bearing 117 and the bearing support below with the aid of fasteners, for example four fasteners with two fasteners on each side. The bearing strap 116 and bearing 117 may both overlap and extend in both directions from the vertical center of the bearing shaft 128. The bearing 117 may be longer than the bearing strap 116 and extend up to the or substantially up to the entire length of the bearing shaft 128. The bearing strap 116 itself may be longer than half of the bearing shaft 128. The compact bearing assembly may have only one bearing 117 as well as only one bearing strap 116. The bearing 117 has two or more bearing thrust surfaces 126 that each directly contacts one the cradle thrust surface 158 of opposing cradles 100 to provide frictional load on the bearing shaft 128 that can dampen dynamic responses arising in the tracker during operation such as during wind events. The bearing thrust surfaces 126 may be on opposing sides of the bearing 117, may be planar, and may have a non-rectangular shape. The cradle thrust surface 158 may be planar and may have a rectangular or square shape, and the bearing shaft 128 may be disposed through the center of the cradle thrust surface 158 to protrude out of the other side. The cradle thrust surface 158 may have edges in contact with curved corners of the cradle 100. The frictional load may be achieved by the bearing strap 116 and/or the bearing 117 directly contacting the shaft 128 and transferring the force from the cradle thrust surface 158.

Figure 9:
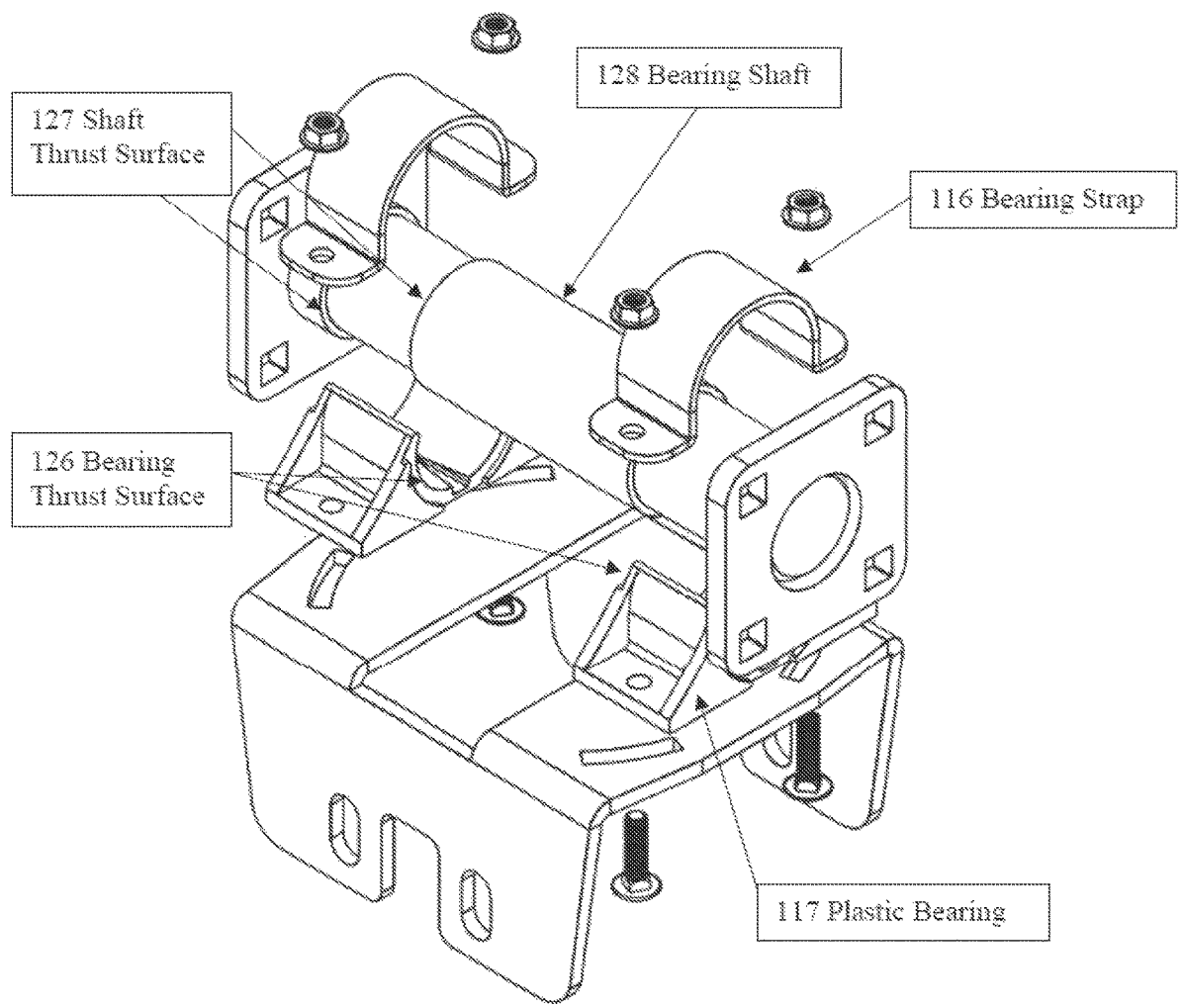
FIG. 9 is an alternative variation of the example of FIGS. 8A-8C and shows a bearing assembly that includes thrust bearing surfaces as part of the shaft itself rather than as part of the cradles.

FIG. 9 shows a bearing assembly with integrated thrust bearing and frictional damping, including two bearings instead of just one. The plastic bearing 117 can provide a thrust surface 126 against which the shaft thrust surface 127, or face of a cradle 100 as shown in FIG. 3, can contact to maintain the position of the bearing shaft 128 in the center of the bearing. Other methods may use an articulating joint, flexure device, or other device, instead of a bearing shaft 128. In addition, the plastic bearing 117 and the bearing strap 116 can provide frictional load on the bearing shaft 128 that can be useful for damping dynamic responses that may arise in the tracker during operation such as during wind events. The bearing shaft 128 may have square plates between it and the cradles rather than being directly welded onto the cradles itself. The bearing shaft here may be smaller diameter than the one shown in FIGS. 8A-8C, and may have a varying diameter, where the diameter is smaller at the thrust surfaces than, for example, at the vertical center of the bearing shaft or in the regions closest to the cradles.

Figure 10:
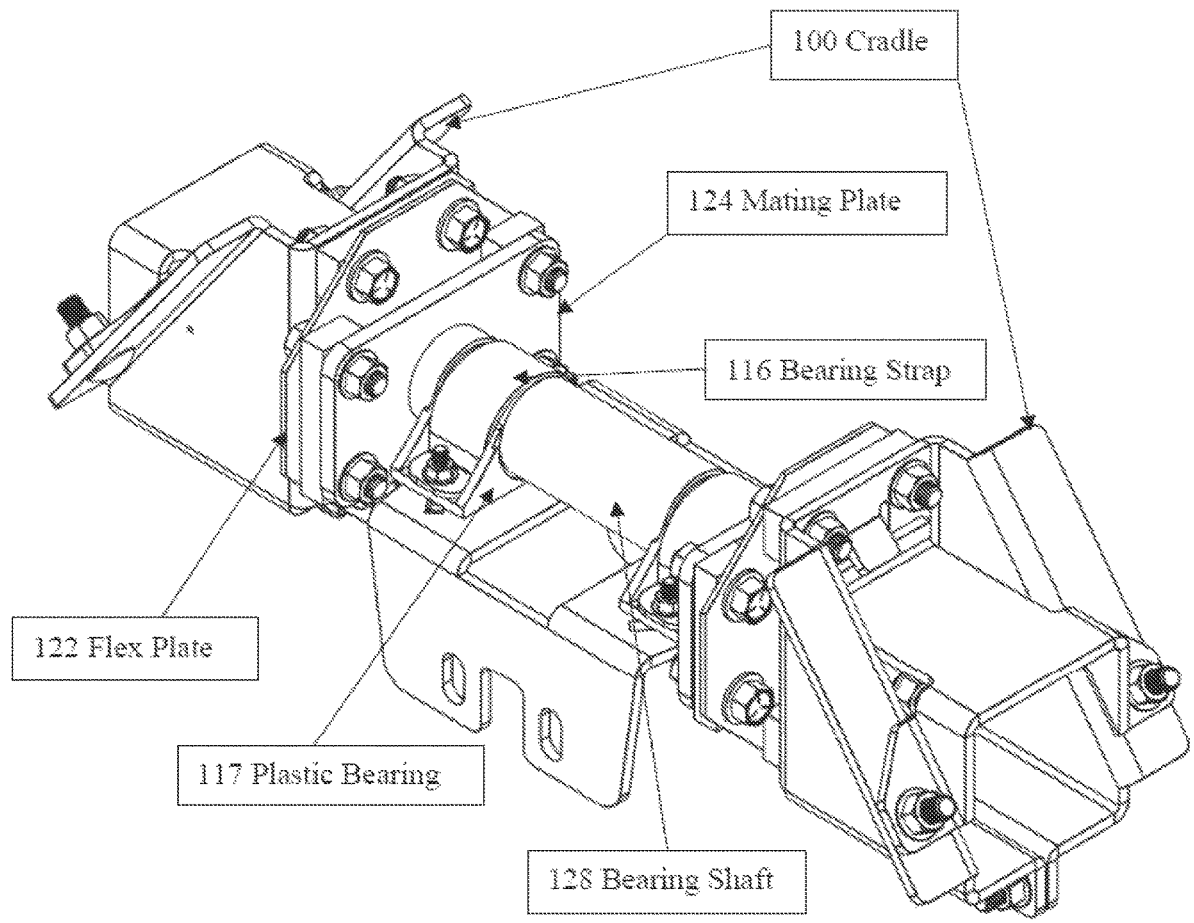
FIG. 10 is an alternative variation of the example of FIGS. 7A-7C and shows two flex plates outboard of the bearing assembly. This variation may also be modified to only include one flex plate outboard of the bearing assembly.

FIG. 10 shows a flexure bearing with the flexure plates 122 located outboard of the plastic bearings 117 and bearing straps 116. A mating plate 124 can be installed on one or both ends of the bearing shaft 128 to allow the cradles 100 to flex to accommodate differing incoming and outgoing angles of the torque tubes supported by the cradles 100. The longest dimension of the mating plate 124 may be perpendicular to the longest dimension of the cradle back. A flex plate 122 is between the mating plate 124 and the cradle 100 to allow differing incoming and outgoing angles for the torque tubes supported by the cradles 100. The flex plate 122 may be octagonal. An overload spring may also be in contact with the flex plate 122 to prevent cracking caused by boltheads. A spacer 154 may help the mating plate contact the flex plate 122.

Figure 11A:
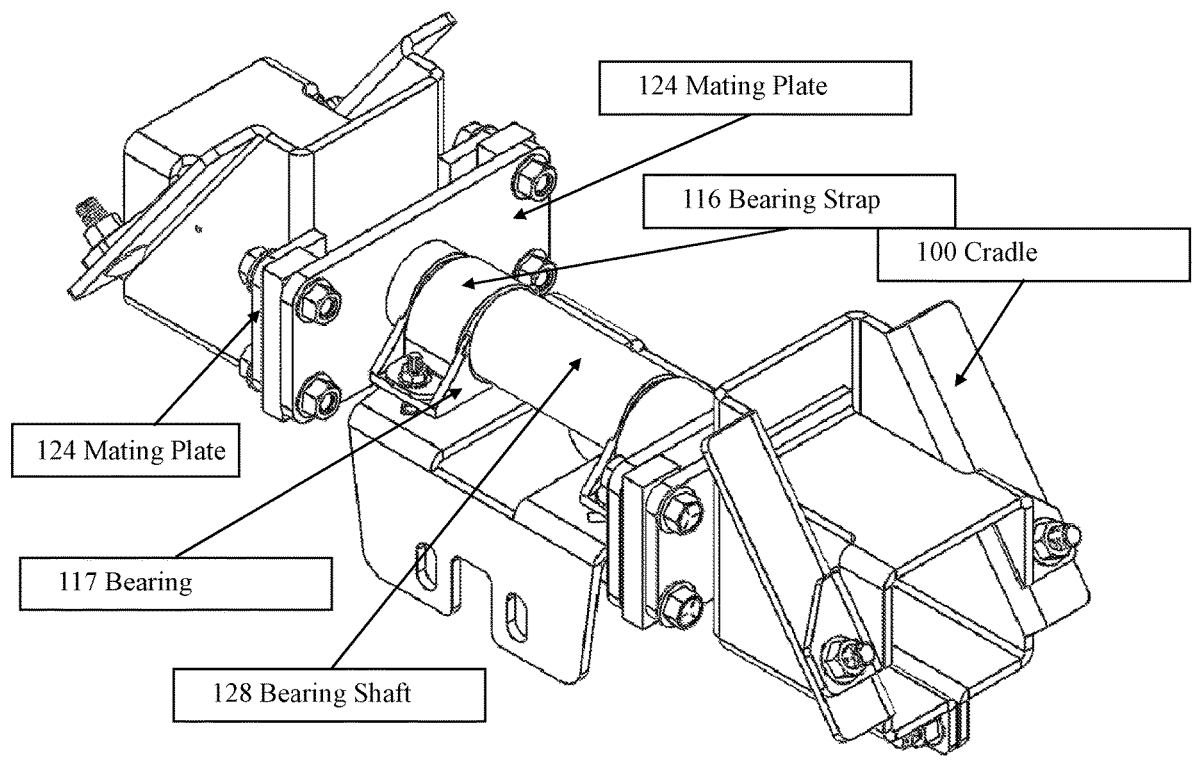
FIGS. 11A-11B is an alternative variation of the example of FIG. 10, without a middle flex plate in the outboard flexures of the bearing assembly.
Figure 11B:
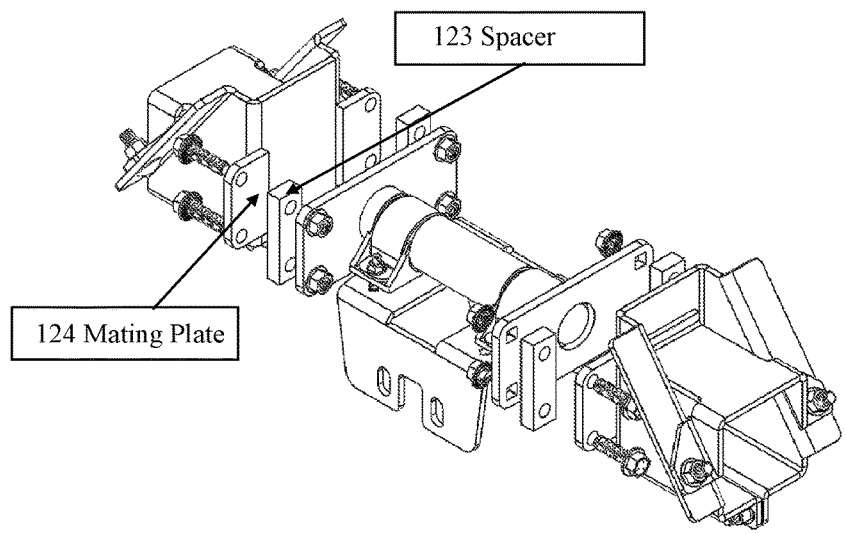

FIGS. 11A and 11B show a flexure bearing with mating plates 124 located outboard of the plastic bearings 117 and bearing straps 116. In this embodiment the two mating p124 do not have a flex plate in between. Even so, they have flexibility to allow differing incoming and outgoing angles for the torque tubes supported by the cradles 100. For example, they can flex around two perpendicular axes that sit within a plane in between them (e.g., in the midpoint between them), the normal of the plane being the same direction that the bearing shaft 128 extends along. The mating plates 124 are not illustrated here in direct contact with each other, being in direct contact with spacers 123 between them. Alternatively, they may have bent edges so that they are in direct contact with each other. One of the mating plates 124 may be in direct contact with or integral with the bearing shaft 128. The other of the mating plates 124 may be in direct contact with or welded and integral with the cradle 100. For example, it may extend from the rectangular back of the cradle 100 to form wings. The two mating plates 124 here may have their longest dimensions extending in the same direction and/or have their overall shapes to be matching with each other in orientation. Each of the mating plates 124 may be rectangular or non-rectangular. Of course, the devices shown in FIGS. 10 and 11A-11B may use a compact bearing assembly as shown in FIGS. 8A-8C rather than a bearing assembly having two bearings.

Figure 12A:
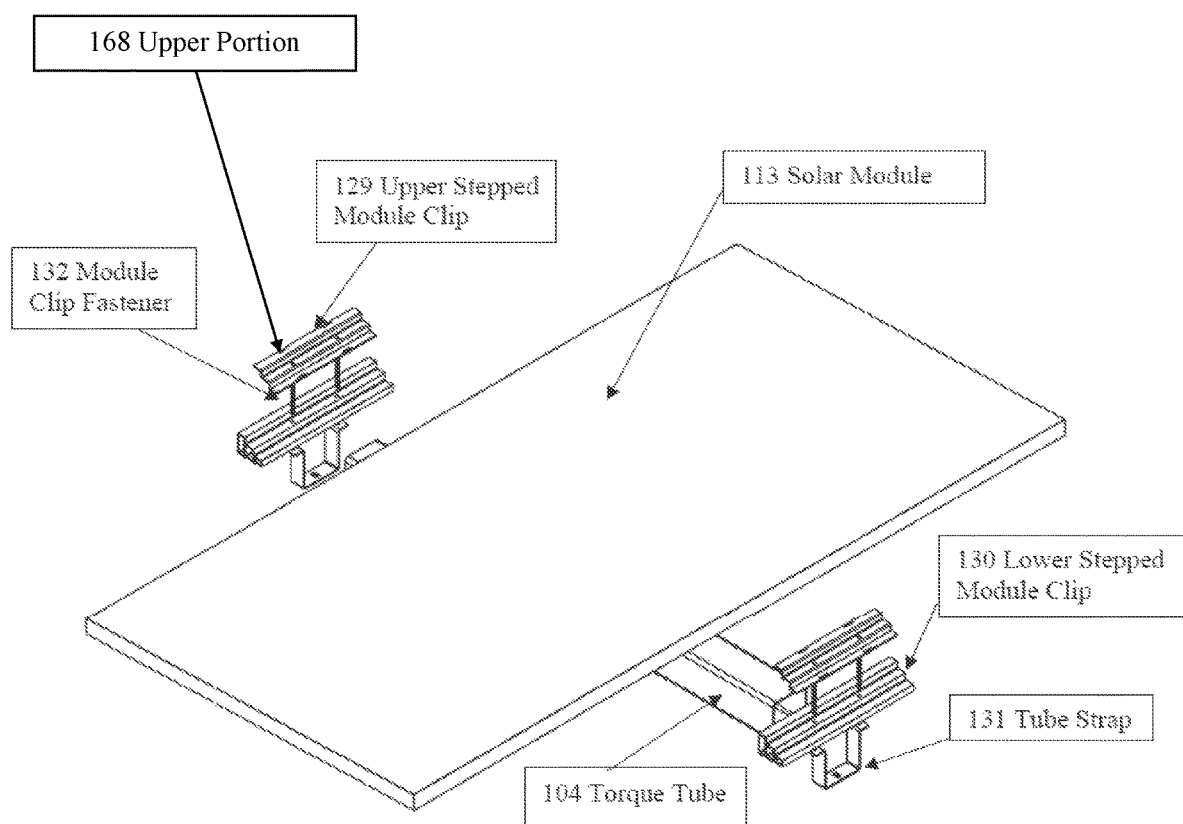
FIGS. 12A and 12B show an exploded view and a side view of a stepped module clip assembly.
Figure 12B:
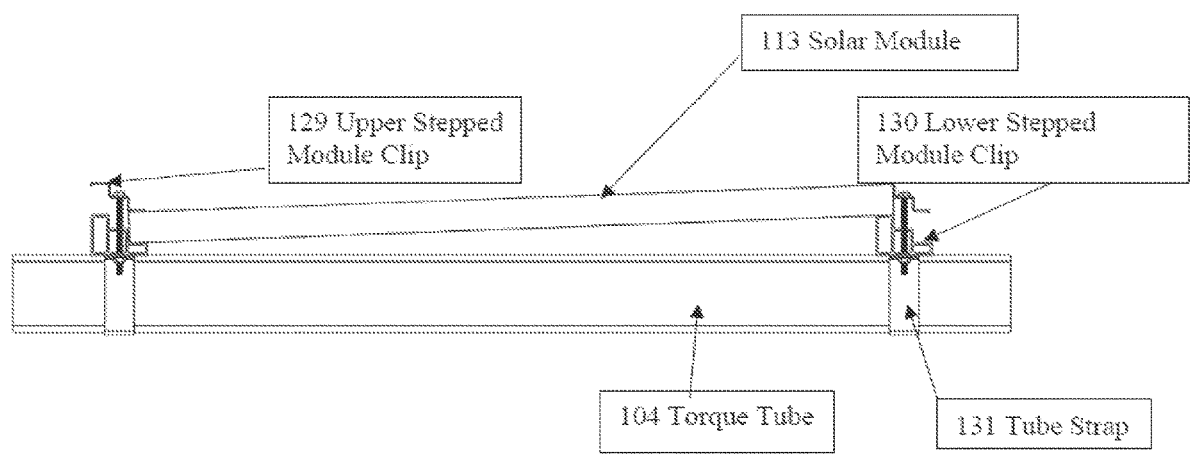

FIGS. 12A and 12B show a stepped module clip. A module clip clamps a solar module 113 to a torque tube 104. The stepped module clip may comprise an upper stepped module clip 129, a lower stepped module clip 130, a tube strap 131, and module clip fasteners 132. Both the lower and upper stepped module clips have multiple levels on which the edge of the module can be placed, for example, two or more steps, e.g., three steps each. Using the upper edge of a lower module clip on one side of a solar module, and the lower edge of another module clip on the other side of a solar module, will result in the solar module being installed in a non-parallel manner with the torque tube. They may be installed on the torque tube facing the same direction, with the solar module being clipped at one end on one side of the module clip and clipped on the other end of the at the opposing side of the module clip. Because the module clip is asymmetric and facing the same side this results in the non-parallel orientation of the solar module. The upper stepped module clip 129 and lower stepped module clip 130 may have a length on their longest sides in a direction perpendicular to the torque tube and parallel to longest side of the solar module. The upper stepped module clip 129 may be shorter than the lower stepped module clip 130, or they may have the same length. The stepped module clip may comprise one, two, or more fasteners fastening the upper stepped module clip 129 to the lower stepped module clip 130, and fastening both to the tube strap 131 which secures the module clip to the torque tube. The tube strap 131 may have a rectangular or square shape.

Figure 13:
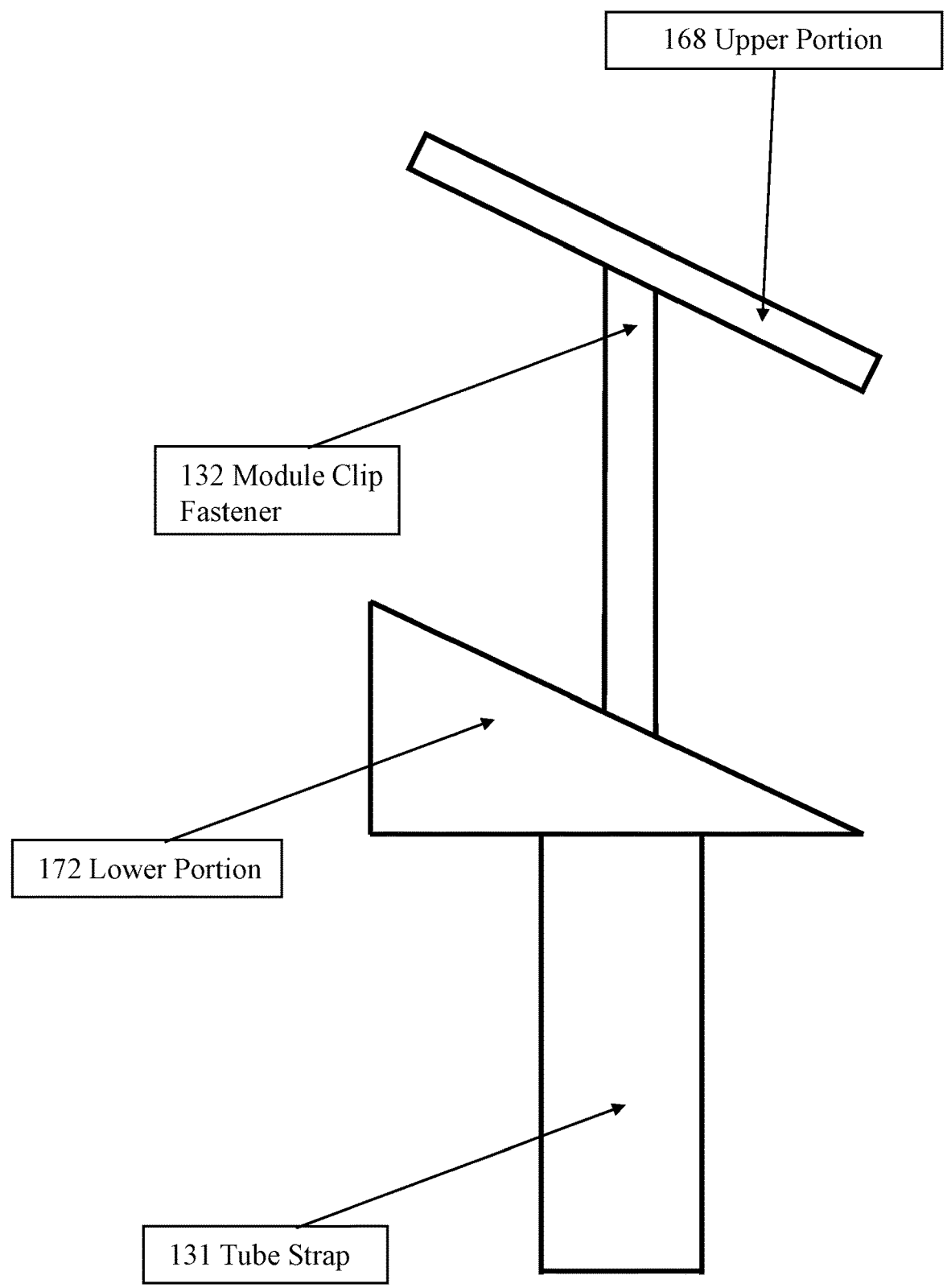
FIG. 13 is an alternative variation of the example of FIGS. 12A-12B, and shows a side view of a module clip assembly that does not have steps.

As FIG. 13 shows, in an embodiment the module clip may have smooth or flat surfaces on all sides and have no steps. The angled upper portion 168 and lower portion 172 still allows the clipping of solar module to be non-parallel to the torque tube.

This disclosure is illustrative and not limiting. Further modifications will be apparent to one skilled in the art in light of this disclosure and are intended to fall within the scope of the appended claims.

What is claimed is:
1. A tracker comprising:
   a bearing assembly configured for clockwise rotation around a first axis and counterclockwise rotation around the first axis;
   an impact surface structure coupled to the bearing assembly and comprising an impact surface;
   an impact bracket assembly coupled to the bearing assembly and comprising a plurality of plates and an impact bar extending between the plates, the impact bar con- figured to contact the impact surface of the impact surface structure to stop at least one of the clockwise rotation of the bearing assembly around the first axis at a first maximum angle of rotation and the counterclockwise rotation of the bearing assembly around the first axis at a second maximum angle of rotation;

a solar module mounting structure coupled to the bearing assembly and spaced apart from the impact bracket assembly and configured to rotate with the bearing assembly around the first axis; and a solar module attached to the solar module mounting structure.

2. The tracker of claim 1, wherein the impact surface structure is a foundation supporting the bearing assembly.

3. The tracker of claim 2, wherein the plurality of plates comprise two plates extending parallel to each other in a first direction and comprising an attachment end and an opposite end to the attachment end, the two plates attached at the attachment end to the bearing assembly, the impact bracket assembly comprising an impact bar extending in a second direction perpendicular to the first direction to be between and to connect the opposite ends of the two plates, the impact bar configured to contact the impact surface of the foundation to stop at least one of the clockwise rotation of the bearing assembly around the first axis at a first maximum angle of rotation and the counterclockwise rotation of the bearing assembly around the first axis at a second maximum angle of rotation.

4. The tracker of claim 1, wherein the solar module mounting structure is a torque tube.

5. The tracker of claim 4, wherein the torque tube has a rectangular or round cross-section.

6. The tracker of claim 1, wherein the plurality of plates each respectively comprise a hole arranged to accommodate at least one cable or a cable-supporting bracket.

7. The tracker of claim 1, wherein the bearing assembly comprises a bearing support, at least one bearing attached to the bearing support, and a shaft attached to the at least one bearing and extending along the first axis.

8. The tracker of claim 7, wherein the bearing support comprises bearing slots arranged to allow the at least one bearing to move such that the shaft is rotated around a second axis perpendicular to the first axis.

9. The tracker of claim 7, wherein the bearing assembly is a straight bearing assembly and the shaft is a straight bearing shaft, and the at least one bearing is attached to the bearing support and the straight bearing shaft.

10. The tracker of claim 7, wherein the bearing assembly is a flexure bearing assembly comprising a flexure plate configured to allow flexing of the flexure bearing assembly about a third axis perpendicular to the first axis.

11. The tracker of claim 7, wherein the bearing assembly is an articulated bearing assembly comprising an articulating joint.

12. A tracker comprising:

a bearing assembly configured for clockwise rotation around a first axis and counterclockwise rotation around the first axis;

an impact surface structure coupled to the bearing assembly and comprising a foundation supporting the bearing assembly, the foundation comprising an impact surface;

an impact bracket assembly coupled to the bearing assembly configured to contact the impact surface of the impact surface structure to stop at least one of the clockwise rotation of the bearing assembly around the first axis at a first maximum angle of rotation and the counterclockwise rotation of the bearing assembly around the first axis at a second maximum angle of rotation;

a solar module mounting structure coupled to the bearing assembly and configured to rotate with the bearing assembly around the first axis; and a solar module attached to the solar module mounting structure, wherein the impact bracket assembly comprises two plates extending parallel to each other in a first direction and each comprising an attachment region at a midpoint and two opposing ends, the two plates attached at the attachment region to the bearing assembly, the impact bracket assembly comprising two impact bars extending in a second direction perpendicular to the first direction to be between and to connect facing ones of the two opposing ends of the two plates to each other, one of the two impact bars configured to contact the impact surface of the foundation to stop the clockwise rotation of the bearing assembly around the first axis at a first maximum angle of rotation and an other of the two impact bars configured to contact the impact surface of the foundation to stop the counterclockwise rotation of the bearing assembly around the first axis at a second maximum angle of rotation.

13. An impact bracket assembly comprising:

a bearing assembly configured to be coupled to an impact surface structure and configured for clockwise rotation around a first axis and counterclockwise rotation around the first axis;

two plates extending parallel to each other in a first direction and comprising an attachment end and an opposite end to the attachment end, the two plates each attached at the attachment end to the bearing assembly at a plurality of attachment points; and an impact bar extending in a second direction perpendicular to the first direction to connect and be between and the opposite ends of the two plates, the impact bar configured to contact the impact surface structure to stop at least one of the clockwise rotation of the bearing assembly around the first axis at a first maximum angle of rotation and the counterclockwise rotation of the bearing assembly around the first axis at a second maximum angle of rotation.

14. The impact bracket assembly of claim 13, wherein the bearing assembly comprises a bearing support, at least one bearing attached to the bearing support, and a shaft attached to the at least one bearing and extending along the first axis.

15. The impact bracket assembly of claim 14, wherein the bearing support comprises bearing slots arranged to allow the at least one bearing to move such that the shaft is rotated around a second axis perpendicular with the first axis.

16. The impact bracket assembly of claim 14, wherein the bearing assembly is a straight bearing assembly, and the at least one bearing comprises two bearings attached to the bearing support and the shaft.

17. The impact bracket assembly of claim 14, wherein the bearing assembly is a flexure bearing assembly comprising a flexure plate configured to allow flexing of the flexure bearing assembly about a third axis perpendicular to the first axis.

18. The impact bracket assembly of claim 14, wherein the bearing assembly is an articulated bearing assembly comprising an articulating joint.

19. The impact bracket assembly of claim 13, wherein the impact bracket assembly comprises a cradle configured to support a solar module mounting structure to the impact bracket assembly, and the cradle comprises a sight hole arranged to allow sight of an end the solar module mounting structure secured in the cradle.

* * * * *